(12) United States Patent
Willis

(10) Patent No.: US 9,861,941 B2
(45) Date of Patent: Jan. 9, 2018

(54) MODIFIED SULFONATED BLOCK COPOLYMERS AND THE PREPARATION THEREOF

(75) Inventor: Carl L. Willis, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 492 days.

(21) Appl. No.: 13/181,306

(22) Filed: Jul. 12, 2011

(65) Prior Publication Data

US 2013/0015071 A1 Jan. 17, 2013

(51) Int. Cl.
| | | |
|---|---|---|
| *B01D 61/46* | (2006.01) | |
| *B01D 71/80* | (2006.01) | |
| *C08F 8/36* | (2006.01) | |
| B01D 61/44 | (2006.01) | |
| B01D 61/48 | (2006.01) | |
| B01D 71/28 | (2006.01) | |
| B01D 71/68 | (2006.01) | |

(Continued)

(52) U.S. Cl.
CPC ............ *B01D 71/80* (2013.01); *C08F 8/36* (2013.01); *B01D 61/445* (2013.01); *B01D 61/48* (2013.01); *B01D 71/28* (2013.01); *B01D 71/68* (2013.01); *C02F 1/441* (2013.01); *C02F 1/445* (2013.01); *C02F 1/4693* (2013.01); *C02F 1/4695* (2013.01); *H01M 8/103* (2013.01); *H01M 8/1023* (2013.01); *Y10T 442/20* (2015.04); *Y10T 442/2762* (2015.04)

(58) Field of Classification Search
CPC ........ C08F 297/02; C08F 8/36; B01D 61/445; B01D 61/48; B01D 71/28; B01D 71/68; B01D 71/80; C02F 1/441; C02F 1/445; C02F 1/4693; C02F 1/4695; H01M 8/1018; H01M 8/1023; H01M 8/103; Y10T 442/20; Y10T 442/2762
USPC .................... 428/500; 429/33, 30; 260/79, 2
See application file for complete search history.

(56) References Cited

U.S. PATENT DOCUMENTS

| | | | |
|---|---|---|---|
| 2,854,425 | A | 9/1958 | Bogel et al. |
| 3,281,257 | A | 10/1966 | Shy |

(Continued)

FOREIGN PATENT DOCUMENTS

| | | |
|---|---|---|
| CA | 716745 A | 8/1965 |
| CA | 2377553 A1 | 2/2001 |

(Continued)

OTHER PUBLICATIONS

International Search Report for PCT/US2012/038762, dated Jan. 4, 2013.

(Continued)

*Primary Examiner* — Michael B Nelson
(74) *Attorney, Agent, or Firm* — Ekatherina Serysheva

(57) ABSTRACT

Described herein are modified sulfonated block copolymers which comprise at least two polymer end blocks A and at least one polymer interior block B, wherein each A block contains essentially no sulfonic acid or sulfonate functional groups and each B block comprises sulfonation susceptible monomer units and, based on the number of the sulfonation susceptible monomer units, from about 10 to about 100 mol % of a functional group of formula (I)

$$-SO_2-NR^1R^2 \qquad (I)$$

or of a salt thereof, methods of making them as well as methods of using them, e.g., as membrane materials for electrically or osmotically driven applications.

21 Claims, 6 Drawing Sheets

(51) Int. Cl.
*C02F 1/44* (2006.01)
*C02F 1/469* (2006.01)
*H01M 8/1023* (2016.01)
*H01M 8/103* (2016.01)

(56) References Cited

U.S. PATENT DOCUMENTS

| | | | |
|---|---|---|---|
| 3,450,795 A | 6/1969 | Langer et al. | |
| 3,577,537 A | 5/1971 | Howe et al. | |
| RE27,145 E | 6/1971 | Jones et al. | |
| 3,595,942 A | 6/1971 | Wald et al. | |
| 3,634,549 A | 1/1972 | Shaw et al. | |
| 3,670,054 A | 6/1972 | De La Mare et al. | |
| 3,682,768 A | 8/1972 | Adams et al. | |
| 3,700,633 A | 10/1972 | Wald et al. | |
| 3,735,559 A | 5/1973 | Salemme | |
| 3,783,072 A | 1/1974 | Korpman | |
| 3,985,830 A | 10/1976 | Fetters et al. | |
| 4,107,131 A | 8/1978 | Gergen et al. | |
| 4,107,236 A | 8/1978 | Nayler et al. | |
| 4,217,421 A * | 8/1980 | Beasley | 521/32 |
| 4,221,642 A * | 9/1980 | De Nora et al. | 205/517 |
| 4,313,867 A | 2/1982 | Duvdenvani | |
| 4,365,023 A | 12/1982 | Fujimoto | |
| 4,391,949 A | 7/1983 | St. Clair | |
| 4,444,953 A | 4/1984 | St. Clair | |
| 4,678,025 A | 7/1987 | Oberlander et al. | |
| 4,766,161 A | 8/1988 | Chlanda et al. | |
| 4,797,318 A | 1/1989 | Brooker et al. | |
| 4,909,429 A | 3/1990 | Ankrom et al. | |
| 4,931,070 A | 6/1990 | Prasad et al. | |
| 4,934,148 A | 6/1990 | Prasad et al. | |
| 4,944,776 A | 7/1990 | Keyser et al. | |
| 4,946,899 A | 8/1990 | Kennedy | |
| 5,095,094 A | 3/1992 | Lay et al. | |
| 5,145,748 A | 9/1992 | Gaidis et al. | |
| 5,239,010 A | 8/1993 | Balas | |
| 5,288,773 A | 2/1994 | Gorbaty et al. | |
| 5,340,387 A | 8/1994 | Smith | |
| 5,348,691 A | 9/1994 | McElroy et al. | |
| 5,389,711 A | 2/1995 | Westbrook et al. | |
| 5,468,574 A | 11/1995 | Ehrenberg et al. | |
| 5,516,831 A | 5/1996 | Pottick et al. | |
| 5,620,500 A | 4/1997 | Fukui et al. | |
| 5,677,074 A | 10/1997 | Serpico et al. | |
| 5,679,482 A | 10/1997 | Ehrenberg et al. | |
| 5,679,745 A | 10/1997 | Hamada et al. | |
| 5,709,921 A | 1/1998 | Shawer | |
| 5,785,117 A | 7/1998 | Grinbergs | |
| 5,840,387 A | 11/1998 | Berlowitz-Tarrant et al. | |
| 5,925,621 A | 7/1999 | Zaneveld et al. | |
| 6,028,115 A | 2/2000 | Zaneveld et al. | |
| 6,033,804 A | 3/2000 | Doyle et al. | |
| 6,145,588 A | 11/2000 | Martin et al. | |
| 6,239,182 B1 | 5/2001 | Zaneveld et al. | |
| 6,306,419 B1 | 10/2001 | Vachon et al. | |
| 6,391,981 B1 | 5/2002 | Willis et al. | |
| 6,413,298 B1 | 7/2002 | Wnek et al. | |
| 6,444,767 B1 | 9/2002 | Schade et al. | |
| 6,455,561 B1 | 9/2002 | Dyke et al. | |
| 6,492,469 B2 | 12/2002 | Willis et al. | |
| 6,515,083 B2 | 2/2003 | Ozawa et al. | |
| 6,536,514 B1 | 3/2003 | Sugiyama et al. | |
| 6,537,538 B2 | 3/2003 | Zaneveld et al. | |
| 6,579,948 B1 | 6/2003 | Tan et al. | |
| 6,664,309 B2 | 12/2003 | Svenningsen et al. | |
| 6,664,340 B1 | 12/2003 | Kaerki et al. | |
| 6,686,423 B1 | 2/2004 | Desbois et al. | |
| 6,699,941 B1 | 3/2004 | Handlin et al. | |
| 6,703,446 B2 | 3/2004 | Schwindeman et al. | |
| 6,716,777 B2 | 4/2004 | Lin | |
| 6,767,976 B2 | 7/2004 | Hamada et al. | |
| 6,777,082 B2 | 8/2004 | Patel et al. | |
| 6,838,391 B2 | 1/2005 | Harle | |
| 6,841,601 B2 | 1/2005 | Serpico et al. | |
| 6,932,619 B2 | 8/2005 | Chen | |
| 7,029,559 B2 | 4/2006 | Jongok et al. | |
| 7,060,788 B2 | 6/2006 | Hucks et al. | |
| 7,152,670 B2 | 12/2006 | Dobbs et al. | |
| 7,160,551 B2 | 1/2007 | McHugh et al. | |
| 7,169,848 B2 | 1/2007 | Bening et al. | |
| 7,228,891 B2 | 2/2007 | Shin et al. | |
| 7,188,666 B2 | 6/2007 | Yeon et al. | |
| 7,231,967 B2 | 6/2007 | Haglid | |
| 7,307,127 B1 | 12/2007 | Napadensky et al. | |
| 7,309,522 B2 | 12/2007 | Webb et al. | |
| 7,312,292 B2 | 12/2007 | Ravikiran | |
| 7,320,361 B2 | 1/2008 | Arai et al. | |
| 7,323,265 B2 | 1/2008 | Fan et al. | |
| 7,598,337 B2 | 10/2009 | Hung et al. | |
| 7,601,785 B2 | 10/2009 | Chang et al. | |
| 7,737,224 B2 | 6/2010 | Willis et al. | |
| 7,740,968 B2 | 6/2010 | Yamashita et al. | |
| 7,754,844 B2 | 7/2010 | Sakaguchi et al. | |
| 7,807,759 B2 | 10/2010 | Shin et al. | |
| 7,851,575 B2 | 12/2010 | Ravikiran | |
| 7,919,565 B2 | 4/2011 | Willis et al. | |
| 7,977,713 B2 | 7/2011 | Sankin et al. | |
| 8,012,539 B2 | 9/2011 | Handlin et al. | |
| 2001/0053475 A1 | 12/2001 | Ying et al. | |
| 2003/0049511 A1 | 3/2003 | Ritts et al. | |
| 2003/0106680 A1 | 6/2003 | Serpico et al. | |
| 2003/0129469 A1 | 7/2003 | Sun et al. | |
| 2003/0198858 A1 | 10/2003 | Sun et al. | |
| 2003/0228681 A1 | 12/2003 | Serpico et al. | |
| 2004/0005490 A1 | 1/2004 | Fan et al. | |
| 2004/0029014 A1 | 2/2004 | Hwang et al. | |
| 2004/0101753 A1 | 5/2004 | Hwang | |
| 2004/0137813 A1 | 7/2004 | Faucher | |
| 2004/0142910 A1 | 7/2004 | Vachon et al. | |
| 2004/0234851 A1 | 11/2004 | Kim et al. | |
| 2005/0061381 A1 | 3/2005 | Hosoi | |
| 2005/0133204 A1 | 6/2005 | Serpico et al. | |
| 2005/0266290 A1 | 12/2005 | Sun et al. | |
| 2006/0154126 A1 | 7/2006 | Ritts et al. | |
| 2007/0021569 A1 * | 1/2007 | Willis et al. | 525/314 |
| 2007/0027569 A1 | 1/2007 | Willis et al. | |
| 2007/0259237 A1 * | 11/2007 | Kormann et al. | 429/30 |
| 2008/0085437 A1 | 4/2008 | Dean et al. | |
| 2008/0124563 A1 | 5/2008 | Shima | |
| 2008/0171252 A1 | 7/2008 | Hirano et al. | |
| 2008/0305251 A1 | 12/2008 | Fukuta et al. | |
| 2009/0123804 A1 * | 5/2009 | Yamashita et al. | 429/33 |
| 2009/0126370 A1 | 5/2009 | Tsai | |
| 2009/0246593 A1 | 10/2009 | Nowatari et al. | |
| 2009/0263699 A1 | 10/2009 | Sadasue et al. | |
| 2009/0280255 A1 | 11/2009 | Handlin, Jr. et al. | |
| 2009/0314480 A1 | 12/2009 | Grinbergs et al. | |
| 2010/0031817 A1 | 2/2010 | Ehrenberg et al. | |
| 2010/0048817 A1 | 2/2010 | Dado et al. | |
| 2010/0087783 A1 | 4/2010 | Weber et al. | |
| 2010/0159353 A1 | 6/2010 | Ohgi et al. | |
| 2010/0167100 A1 | 7/2010 | Moore et al. | |
| 2010/0167159 A1 | 7/2010 | Ono et al. | |
| 2010/0170776 A1 | 7/2010 | Ehrenberg et al. | |
| 2010/0203782 A1 | 8/2010 | Willis et al. | |
| 2010/0204403 A1 | 8/2010 | Willis et al. | |
| 2010/0233569 A1 | 9/2010 | Ono et al. | |
| 2010/0261799 A1 | 10/2010 | Vachon et al. | |
| 2010/0264369 A1 | 10/2010 | Zhang | |
| 2010/0273901 A1 | 10/2010 | Ehrenberg et al. | |
| 2011/0042214 A1 | 2/2011 | Rath et al. | |
| 2011/0021569 A1 | 4/2011 | Willis | |
| 2011/0086982 A1 | 4/2011 | Willis | |
| 2011/0230614 A1 | 9/2011 | Handlin et al. | |
| 2011/0268901 A1 | 11/2011 | Handlin et al. | |

FOREIGN PATENT DOCUMENTS

| | | |
|---|---|---|
| CA | 2616250 A1 | 1/2007 |
| DE | 3930217 A1 | 3/1991 |
| DE | 19728686 C1 | 4/1999 |
| FR | 2662604 A2 | 12/1991 |
| GB | 419604 A | 11/1934 |

(56) References Cited

FOREIGN PATENT DOCUMENTS

| | | |
|---|---|---|
| GB | 949126 A | 2/1956 |
| GB | 1019847 A | 10/1963 |
| GB | 1144167 A | 3/1969 |
| GB | 1336764 A | 11/1973 |
| GB | 1380411 A | 1/1975 |
| GB | 2066267 A | 7/1981 |
| GB | 2107325 A | 4/1983 |
| GB | 2168648 A | 6/1986 |
| GB | 2272220 A | 5/1994 |
| GB | 2399787 A | 9/2004 |
| GB | 2434762 A | 8/2007 |
| GB | 2444242 A | 6/2008 |
| JP | 53136082 A | 11/1978 |
| JP | 1256583 A | 10/1989 |
| JP | 1559652 C | 5/1990 |
| JP | 4053885 A | 2/1992 |
| JP | 5303918 A | 11/1993 |
| JP | 6000923 A | 1/1994 |
| JP | 7018237 A | 1/1995 |
| JP | 1910228 C | 3/1995 |
| JP | 1914163 C | 3/1995 |
| JP | 7060907 A | 3/1995 |
| JP | 7082428 A | 3/1995 |
| JP | 1926012 C | 4/1995 |
| JP | 2549576 B2 | 10/1996 |
| JP | 9074273 A | 3/1997 |
| JP | 9078431 A | 3/1997 |
| JP | 9094925 A | 4/1997 |
| JP | 9156009 A | 6/1997 |
| JP | 9217046 A | 8/1997 |
| JP | 9235524 A | 9/1997 |
| JP | 9277478 A | 10/1997 |
| JP | 10061057 A | 3/1998 |
| JP | 10110150 A | 4/1998 |
| JP | 10158454 A | 6/1998 |
| JP | 10298514 A | 11/1998 |
| JP | 2837435 B2 | 12/1998 |
| JP | 2843947 B2 | 1/1999 |
| JP | 2868391 B2 | 3/1999 |
| JP | 3704906 B2 | 3/1999 |
| JP | 11080681 A | 3/1999 |
| JP | 11158299 A | 6/1999 |
| JP | 11199839 A | 7/1999 |
| JP | 2000033671 A | 2/2000 |
| JP | 2000038550 A | 2/2000 |
| JP | 2000136367 A | 5/2000 |
| JP | 2000318102 A | 11/2000 |
| JP | 2000345120 A | 12/2000 |
| JP | 2001020169 A | 1/2001 |
| JP | 2001062968 A | 3/2001 |
| JP | 3164554 B2 | 5/2001 |
| JP | 3249005 B2 | 1/2002 |
| JP | 2002338918 A | 1/2002 |
| JP | 2004050612 A | 2/2002 |
| JP | 2002105424 A | 4/2002 |
| JP | 3326195 B2 | 9/2002 |
| JP | 3338179 B2 | 10/2002 |
| JP | 3358391 B2 | 12/2002 |
| JP | 3370198 B2 | 1/2003 |
| JP | 3411068 B2 | 5/2003 |
| JP | 3484840 B2 | 1/2004 |
| JP | 3515740 B2 | 4/2004 |
| JP | 2004121828 A | 4/2004 |
| JP | 2004136480 A | 5/2004 |
| JP | 3660771 B2 | 6/2005 |
| JP | 2006021959 A | 1/2006 |
| JP | 3787935 B2 | 6/2006 |
| JP | 2007001086 A | 1/2007 |
| JP | 3887341 B2 | 2/2007 |
| JP | 2007105134 A | 4/2007 |
| JP | 2007126512 A | 5/2007 |
| JP | 3940952 B2 | 7/2007 |
| JP | 3967842 B2 | 8/2007 |
| JP | 2007238746 A | 9/2007 |
| JP | 2008073888 B2 | 4/2008 |
| JP | 2008127447 A | 6/2008 |
| JP | 2009143998 A | 7/2009 |
| JP | 4327040 B2 | 9/2009 |
| JP | 4414016 B2 | 2/2010 |
| JP | 2010085585 A | 4/2010 |
| JP | 2010106090 A | 5/2010 |
| JP | 4544563 B2 | 9/2010 |
| KR | 20020076825 A | 10/2002 |
| KR | 20040013555 A | 2/2004 |
| WO | 1998021773 A1 | 5/1998 |
| WO | 2001009239 A1 | 2/2001 |
| WO | 2002072242 A1 | 1/2002 |
| WO | 2003050896 A3 | 10/2002 |
| WO | 2003050897 A3 | 10/2003 |
| WO | 2004004688 A1 | 1/2004 |
| WO | 2004032306 A3 | 7/2004 |
| WO | 2004070312 A1 | 8/2004 |
| WO | 2004051172 A1 | 3/2005 |
| WO | 2007010039 A1 | 1/2007 |
| WO | 2007010042 A1 | 1/2007 |
| WO | 2008030939 A3 | 7/2008 |
| WO | 2008089332 A2 | 7/2008 |
| WO | 2011065460 A1 | 6/2011 |

OTHER PUBLICATIONS

A.S. Yeung and C.W. Frank, Polymer, 31, pp. 2089-2100, 2100-2111 (1990).

G.W. Coates, P.D. Hustad and S. Reinartz, Agnew Chem. Int. Ed., 41, 2236-2257 (2002).

H. Zhang and K. Nomura, (J. Am. Chem. Soc., Commun., 2005).

C.J. Hawker, A.W. Bosman and E Harth, Chem. Rev., 101(12), 3661-3668 (2001).

* cited by examiner

MODIFIED SULFONATED BLOCK COPOLYMERS AND THE PREPARATION THEREOF

FIELD OF THE INVENTION

The present disclosure relates to modified sulfonated block copolymers, that is, to sulfonated block copolymers in which the sulfonic acid or sulfonate functional groups are modified. More specifically, the modified sulfonated block copolymers have at least two polymer end blocks A and at least one polymer interior block B. Each A block contains essentially no sulfonic acid or sulfonate functional groups and each B block comprises sulfonation susceptible monomer units and, based on the number of the sulfonation susceptible monomer units, from about 10 to about 100 mol % of a functional group of formula (I)

$$-SO_2-NR^1R^2 \qquad (I)$$

or of a salt thereof, wherein
$R^1$ is a moiety $-(A^1-NR^a)_x R^b$ or a moiety $-(A^1-NR^a)_y -A^2-Z$; and
$R^2$ is hydrogen, alkyl, or is one of the moieties $R^1$; or
$R^1$ and $R^2$ together with the nitrogen to which they are bonded form an optionally substituted 5- to 7-membered ring consisting of 1-3 nitrogen, 2-6 carbon, and optionally 1 or 2 non-adjacent oxygen and/or sulfur ring atoms,
x is 0, 1, 2 or 3;
y is 1 or 2;
$A^1$ and $A^2$, each independently, is straight chain alkylene optionally substituted by one or more methyl and/or ethyl groups;
$R^a$ and $R^b$, each independently, is hydrogen or alkyl;
Z is $-CO_2H$, $-SO_3H$ or $-P(O)(OH)_3$.

The present disclosure also provides processes for making the modified sulfonated block copolymers, and products comprising them. The modified sulfonated block copolymers exhibit extraordinary properties with regard to dimensional stability, water transport and selective ion transport. Accordingly, products such as membranes which comprise the modified sulfonated block copolymers are advantageous in applications such as electrically driven water separation processes as well as osmotically driven separation processes such as forward osmosis, filtration, and "blue energy" applications.

BACKGROUND OF THE INVENTION

The preparation of styrenic block copolymers is well known in the art. Generally, styrenic block copolymers ("SBC") can comprise internal polymer blocks and terminal end polymer blocks comprising chemically different monomer types thereby providing particular desirable properties. As an example, in a more common form, SBC's may have internal blocks of conjugated diene and external blocks having aromatic alkenyl arenes. The interaction of the differing properties of the polymer blocks allow for different polymer characteristics to be obtained. For example, the elastomer properties of internal conjugated diene blocks along with the "harder" aromatic alkenyl arenes external blocks together form polymers which are useful for an enormous variety of applications. Such SBC's can be prepared through sequential polymerization and/or through coupling reactions.

It is known also that SBC's can be functionalized in order to further modify their characteristics. An example of this is the addition of sulfonic acid or sulfonate ester functional groups to the polymer backbone. One of the first such sulfonated block copolymers is disclosed, for example, in U.S. Pat. No. 3,577,357 to Winkler. The resulting block copolymer was characterized as having the general configuration $A-B-(B-A)_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The sulfonated block copolymers were described as having water absorption characteristics that might be useful in water purification membranes and the like, but were later found not to be castable into films (U.S. Pat. No. 5,468,574).

More recently, U.S. Pat. No. 7,737,224 to Willis et al., disclosed the preparation of sulfonated polymer and inter alia illustrated a sulfonated block copolymer that is solid in water comprising at least two polymer end blocks and at least one saturated polymer interior block wherein each end block is a polymer block resistant to sulfonation and at least one interior block is a saturated polymer block susceptible to sulfonation, and wherein at least one interior block is sulfonated to the extent of 10 to 100 mol percent of the sulfonation susceptible monomer in the block. The sulfonated block copolymers are described as being able to transport high amounts of water vapor while at the same time having good dimensional stability and strength in the presence of water, and as being valuable materials for end use applications which call for a combination of good wet strength, good water and proton transport characteristics, good methanol resistance, easy film or membrane formation, barrier properties, control of flexibility and elasticity, adjustable hardness, and thermal/oxidative stability.

Additionally, WO 2008/089332 to Dado et al., discloses a process for preparing sulfonated block copolymers illustrating, e.g., the sulfonation of a precursor block polymer having at least one end block A and at least one interior block B wherein each A block is a polymer block resistant to sulfonation and each B block is a polymer block susceptible to sulfonation wherein said A and B blocks are substantially free of olefinic unsaturation. The precursor block polymer was reacted with an acyl sulfate in a reaction mixture further comprising at least one non-halogenated aliphatic solvent. According to Dado et al., the process results in a reaction product which comprised micelles of sulfonated polymer and/or other polymer aggregates of definable size and distribution.

It has also been reported that sulfonated polymers may be neutralized with a variety of compounds. U.S. Pat. No. 5,239,010 to Pottick et al., and U.S. Pat. No. 5,516,831 to Balas et al., for example, indicate that styrene blocks with sulfonic acid functional groups may be neutralized by reacting the sulfonated block copolymer with an ionizable metal compound to obtain a metal salt.

Additionally, U.S. Pat. No. 7,737,224 to Willis et al. indicates the at least partial neutralization of sulfonated block copolymers with a variety of base materials including, for example, ionizable metal compounds as well as various amines. More specific amine neutralized sulfonated block copolymers are described in U.S. Pat. No. 2011/0086982 to Willis et al. Membranes comprising these amine neutralized sulfonated block copolymers transport water and are dimensionally stable under wet conditions

SUMMARY OF THE INVENTION

In a first aspect, the present disclosure relates to a modified sulfonated block copolymer comprising at least two polymer end blocks A and at least one polymer interior block B, wherein each A block contains essentially no sulfonic acid or sulfonate functional groups and each B block comprises sulfonation susceptible monomer units and, based on the number of the sulfonation susceptible monomer units, from about 10 to about 100 mol % of a functional group of formula (I)

—SO$_2$—NR$^1$R$^2$          (I)

or of a salt thereof, wherein
R$^1$ is a moiety -(A$^1$-NR$^a$)$_x$R$^b$ or a moiety -(A$^1$-NR$^a$)$_y$-A$^2$-Z; and
R$^2$ is hydrogen, alkyl, or is one of the moieties R$^1$; or
R$^1$ and R$^2$ together with the nitrogen to which they are bonded form an optionally substituted 5- to 7-membered ring consisting of 1-3 nitrogen, 2-6 carbon, and optionally 1 or 2 non-adjacent oxygen and/or sulfur ring atoms,
x is 0, 1, 2 or 3;
y is 1 or 2;
A$^1$ and A$^2$, each independently, is straight chain alkylene optionally substituted by one or more methyl and/or ethyl groups;
R$^a$ and R$^b$, each independently, is hydrogen or alkyl;
Z is —CO$_2$H, —SO$_3$H or —P(O)(OH)$_3$.

In a second aspect, the present disclosure relates to the modified sulfonated block copolymer in accordance with the foregoing aspect, wherein the block B comprises the functional group of formula (I) or a salt thereof, wherein
R$^1$ is a moiety -(A$^1$-NR$^a$)$_x$R$^b$;
R$^2$ is hydrogen, alkyl, or a moiety -(A$^1$-NR$^a$)$_x$R$^b$;
x is 0 or 1; and
A$^1$ and A$^2$, each independently, is straight chain alkylene.

In a third aspect, the present disclosure relates to the modified sulfonated block copolymer in accordance with either one of the foregoing aspects, wherein the block B comprises the functional group of formula (I) or a salt thereof, wherein R1 is a moiety -(A1-NRa)xRb and R2 is hydrogen or alkyl.

In a fourth aspect, the present disclosure relates to the modified sulfonated block copolymer in accordance with either one of the foregoing aspects, wherein the block B comprises the functional group of formula (I) or a salt thereof, wherein R$^1$ and R$^2$ are identical and are -(A$^1$-NR$^a$)$_x$R$^b$ or -(A$^1$-NR$^a$)$_y$-A$^2$-SO$_3$H moieties.

In a fifth aspect, the present disclosure relates to the modified sulfonated block copolymer in accordance with either one of the foregoing aspects, wherein the block B comprises from about 25 to about 80 mol % of the functional group.

In a sixth aspect, the present disclosure relates to the modified sulfonated block copolymer in accordance with either one of the foregoing aspects, wherein each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

In a seventh aspect, the present disclosure relates to the modified sulfonated block copolymer in accordance with either one of the foregoing aspects, having a general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

In an eighth aspect, the present disclosure relates to the modified sulfonated block copolymer in accordance with either one of the foregoing aspects, comprising one or more blocks D each block D being independently selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

In a ninth aspect, the present disclosure relates a membrane or film comprising the modified sulfonated block copolymer in accordance with either one of the foregoing aspects.

In a tenth aspect, the present disclosure relates to the membrane or film in accordance with the foregoing ninth aspect which has a conductivity of at least 0.5 mS/cm.

In an eleventh aspect, the present disclosure relates to the membrane or film in accordance with the foregoing ninth or tenth aspect which has an anion exchange selectivity of at least 80%.

In a twelfth aspect, the present disclosure relates to the membrane or film in accordance with one the foregoing aspects nine to eleven which has a water absorption of at most 20% by weight, based on the dry weight of the membrane.

In a thirteenth aspect, the present disclosure relates to the membrane or film in accordance with one the foregoing aspects nine to twelve which is obtained by
a) providing a composition comprising the modified sulfonated block copolymer in a liquid phase comprising one or more aprotic organic solvents,
b) casting the composition, and
c) evaporating the liquid phase.

In a fourteenth aspect, the present disclosure relates to an apparatus selected from the group consisting of fuel cells, filtration devices, devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries, and which comprises the membrane or film in accordance with one the foregoing aspects nine to thirteen.

In a fifteenth aspect, the present disclosure relates to an electro-deionization assembly comprising at least one anode, at least one cathode, and one or more membrane(s) wherein at least one membrane is the membrane in accordance with one the foregoing aspects nine to thirteen.

In a sixteenth aspect, the present disclosure relates to the electro-deionization assembly of in accordance with the foregoing fifteenth aspect which comprises at least two membranes wherein at least one membrane is a cation-exchange membrane.

In a seventeenth aspect, the present disclosure relates to the electro-deionization assembly in accordance with the foregoing sixteenth aspect, wherein the cation-exchange membrane comprises a sulfonated block copolymer comprising at least two polymer end blocks A and at least one polymer interior block B, wherein each A block contains essentially no sulfonic acid or sulfonated ester functional groups and each B block comprises sulfonation susceptible monomer units and, based on the number of the sulfonation susceptible monomer units, from about 10 to about 100 mol % of sulfonic acid or sulfonate ester functional groups.

In an eighteenth aspect, the present disclosure relates to the electro-deionization assembly in accordance with the one of the foregoing aspects sixteen and seventeen, which comprises at least two membranes wherein at least one membrane is an anion-exchange membrane.

In a nineteenth aspect, the present disclosure relates to the electro-deionization assembly in accordance with the one of the foregoing aspects fifteen to eighteen, which comprises at least two membranes wherein at least one membrane is a bipolar membrane.

In a twentieth aspect, the present disclosure relates to a coated article comprising a substrate and a coating comprising the modified sulfonated block copolymer of one of the foregoing aspects one to 9.

In a twenty-first aspect, the present disclosure relates to the coated article in accordance with the foregoing twentieth aspect, wherein the substrate is a natural or synthetic, woven and non-woven material, or a mixture thereof.

DETAILED DESCRIPTION OF THE INVENTION

Figure 1:
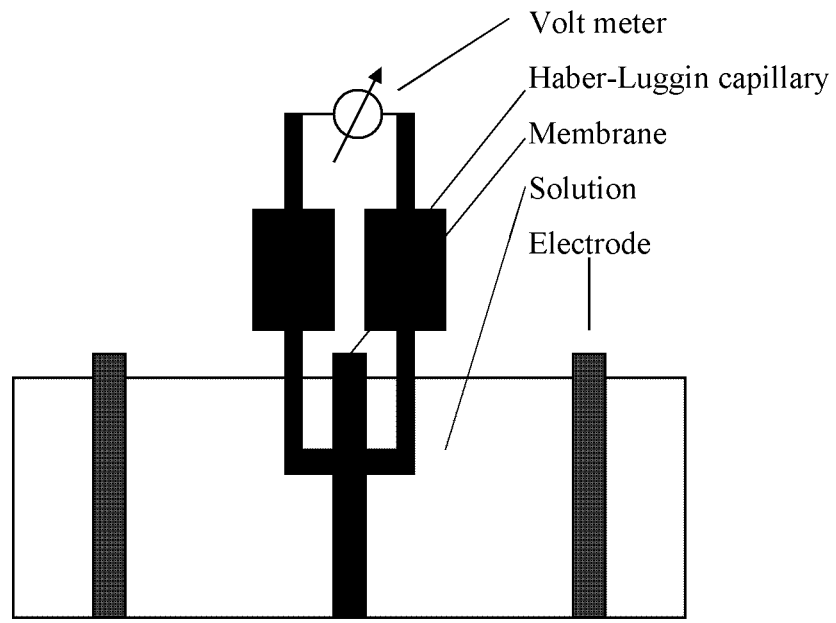
FIG. 1 is a schematic diagram of a set-up for measuring membrane resistance.

A detailed description of embodiments of the present invention is disclosed herein; however, it is to be understood that the disclosed embodiments are merely exemplary of the invention, and that the invention may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present invention.

Unless specifically stated otherwise, all technical terms used herein have the meaning as commonly understood by those skilled in the art.

Moreover, unless specifically stated otherwise, the following expressions as used herein are understood to have the following meanings:

The expression "sulfonated block copolymer" as used herein refers to a sulfonated block copolymer that essentially has not been reacted with an amine, metal or other polar compound and contains sulfonic acid and/or sulfonate ester groups.

The expressions "modified sulfonated block copolymer" and "modified block copolymer" as used herein refer to a sulfonated block copolymer wherein the sulfonic acid and/or sulfonate ester are at least partially converted into functional groups of formula (Ia) or (Ib).

Unless indicated otherwise, the expression "functionalized block copolymers" or the singular thereof as used herein generically refers to sulfonated and to modified sulfonated block copolymers.

Unless indicated otherwise, the expressions "precursor block copolymer" or "precursor polymer" as used herein refers to an optionally hydrogenated block copolymer that has not been sulfonated and/or functionalized.

Unless specifically stated otherwise, the expression "%-wt." as used herein refers to the number of parts by weight of monomer per 100 parts by weight of polymer on a dry weight basis, or the number of parts by weight of ingredient per 100 parts by weight of specified composition.

Unless specifically stated otherwise, the expression "molecular weight" as used herein and relating to a polymer refers to the number average molecular weight.

The expression "equilibrium" as used herein in the context of water absorption refers to the state in which the rate of water absorption by a functionalized block copolymer is in balance with the rate of water loss by the functionalized block copolymer. The state of equilibrium can generally be reached by immersing the functionalized block copolymer in water for a 24 hour period (one day). The equilibrium state may be reached also in other wet environments, however the period of time to reach equilibrium may differ.

The expression "hydrated" block copolymer as used herein refers to a functionalized block copolymer which has absorbed a significant amount of water.

The expression "wet state" as used herein refers to the state at which a functionalized block copolymer has reached equilibrium or has been immersed in water for a period of 24 hours.

The expression "dry state" as used herein refers to the state of hydration of a functionalized block copolymer which has absorbed essentially no or only insignificant amounts of water. For example, a functionalized block copolymer which is merely in contact with the atmosphere is considered to be in the dry state.

Unless specifically stated otherwise, the expression "%-wt." as used herein refers to the number of parts by weight of monomer per 100 parts by weight of polymer on a dry weight basis, or the number of parts by weight of ingredient per 100 parts by weight of specified composition.

Unless specifically stated otherwise, the expression "molecular weight" as used herein and relating to a polymer refers to the number average molecular weight.

Unless specifically stated otherwise, the expression "solution" as used herein refers to a liquid, uniformly dispersed mixture at the molecular or ionic level of one or more substances (the solute) in one or more liquid substances (the solvent).

Unless specifically stated otherwise, the expression "dispersion" as used herein refers to a system having a continuous, liquid phase and at least one discontinuous phase. The discontinuous phase may be made up by solid, finely divided particles and/or by liquid droplets, including colloidal particles and micelles. The expression "dispersion" as used herein in particular includes systems in which at least one discontinuous phase is in form of micelles. Also, where the discontinuous phase(s) is(are) exclusively made up by liquid droplets, the expression "dispersion" in particular encompasses "emulsion." A person of ordinary skill will readily appreciate that there are no sharp differences between dispersions, colloidal or micellar solutions and solutions on a molecular level. Thus, a dispersion of micelles may also herein be referred to as a solution of micelles.

The expression "engineering thermoplastic resin" as used herein encompasses the various polymers such as for example thermoplastic polyester, thermoplastic polyurethane, poly(arylether) and poly(aryl sulfone), polycarbonate, acetal resin, polyamide, halogenated thermoplastic, nitrile barrier resin, poly(methyl methacrylate) and cyclic olefin copolymers, and further defined in U.S. Pat. No. 4,107,131, the disclosure of which is hereby incorporated by reference.

All publications, patent applications, and patents mentioned herein are incorporated by reference in their entirety. In the event of conflict, the present specification, including definitions, is intended to control.

With respect to all ranges disclosed herein, such ranges are intended to include any combination of the mentioned upper and lower limits even if the particular combination is not specifically listed.

According to several embodiments disclosed herein is has been found that modifying the sulfonated block copolymer has a surprising impact on the performance of membranes comprising these block copolymers. For example, in some embodiments, the water uptake of membranes comprising the modified block copolymers is significantly lower than the water uptake of membranes comprising the corresponding sulfonated block copolymers. The reduced tendency of the membranes comprising the modified sulfonated block copolymers to take up water results in a distinctly improved dimensional stability of the membranes as compared to membranes comprising the sulfonated block copolymer. In some embodiments, membranes comprising the modified block copolymers exhibit an exceptionally high level of ion conductivity. In particular embodiments, the ion transport through the membrane is high in spite of the low tendency to take up water. In some embodiments, the membranes exhibit high specific conductivity, high selectivity for cation transport, and low swelling on exposure to water.

Accordingly, the modified sulfonated block copolymers described herein are broadly suited for a wide variety of end uses, and are especially useful for applications involving water or which take place in wet environments. In particular applications the modified sulfonated block copolymers described herein are broadly suited for electrically driven water separation processes, or for osmotically driven separation processes such as forward osmosis, filtration, and "blue energy" applications.

In some embodiments, the sulfonated block copolymers which may be modified according to embodiments of the present disclosure include the sulfonated block copolymers as described in U.S. Pat. No. 7,737,224 to Willis et al. Furthermore, the precursor sulfonated block copolymers which include the sulfonated block copolymers as described in U.S. Pat. No. 7,737,224 may be prepared according to the process of WO 2008/089332 to Dado et al.

The block copolymers needed to prepare the modified sulfonated block copolymers of the present invention may be made by a number of different processes, including anionic polymerization, moderated anionic polymerization, cationic polymerization, Ziegler-Natta polymerization, and living chain or stable free radical polymerization. Anionic polymerization is described below in more detail, and in the patents referenced. Moderated anionic polymerization processes for making styrenic block copolymers are described, for example, in U.S. Pat. Nos. 6,391,981, 6,455,651 and 6,492,469. Cationic polymerization processes for preparing block copolymers are disclosed, for example, in U.S. Pat. Nos. 6,515,083 and 4,946,899.

Living Ziegler-Natta polymerization processes that may be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc. Commun., 2005) describes the use of living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers were synthesized using living or stable free radical techniques. For the polymers of the present invention, nitroxide mediated polymerization methods will be the preferred living chain or stable free radical polymerization process.

1. Polymer Structure

One aspect of the sulfonated block copolymers described herein relates to the polymer structure of the modified sulfonated block copolymers. The modified block copolymers will have at least two polymer end or outer blocks A and at least one saturated polymer interior block B wherein each A block is a polymer block resistant to sulfonation and each B block is a polymer block susceptible to sulfonation.

Preferred polymer structures have the general configuration A-B-A, (A-B)n(A), (A-BA)n, (A-B-A)nX, (A-B)nX, A-B-D-B-A, A-D-B-D-A, (A-D-B)n(A), (A-B-D)n(A), (AB-D)nX, (A-D-B)nX or mixtures thereof, where n is an integer from 2 to about 30, X is coupling agent residue and A, B and D are as defined herein below. Most preferred structures are linear structures such as A-B-A, (A-B)2X, A-B-D-B-A, (AB-D)2X, A-D-B-D-A, and (A-D-B)2X, and radial structures such as (A-B)nX and (A-DB)nX where n is 3 to 6.

Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture may include a certain amount of A-B diblock copolymer, in addition to any linear and/or radial polymers. The respective amounts have not been found to be detrimental to the practice of the invention.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethyl styrene, para-n-propyl styrene, para-iso-propyl styrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymers of ethylene, it may be useful to polymerize ethylene via a Ziegler-Natta process, as taught in the references in the review article by G. W. Coates et. al, as cited above. It is preferred to make the ethylene blocks using anionic polymerization techniques as taught in U.S. Pat. No. 3,450,795. The block molecular weight for such ethylene blocks typically is between about 1,000 and about 60,000.

When the A blocks are polymers of alpha olefins of 3 to 18 carbon atoms, such polymers are prepared by via a Ziegler-Natta process, as taught in the references in the review article by G. W. Coates et. al, as cited above. Preferably, the alpha olefins are propylene, butylene, hexene or octene, with propylene being most preferred. The block molecular weight for such alpha olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. Nos. 3,670,054 and in 4,107,236

The A blocks may also be polymers of acrylic esters or methacrylic esters. Such polymer blocks may be made according to the methods disclosed in U.S. Pat. No. 6,767,976. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methylacrylate, ethylacrylate, propyl acrylate, n-butyl acrylate, isobutyl acrylate, hexyl acrylate, 2-ethylhexyl acrylate, dodecyl acrylate, lauryl acrylate, methoxyethylacrylate, dimethylaminoethylacrylate, diethylaminoethylacrylate, glycidyl acrylate, trimethoxysilylpropyl acrylate, trifluoromethyl acrylate, trifluoroethylacrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present invention. Examples of the anionic polymerizable monomer that can be optionally used include methacrylic or acrylic monomers such as trimethylsilyl methacrylate, N,N-dimethylmethacrylamide, N,N-diisopropylmethacrylamide, N,N-diethylmethacrylamide, N,Nmethylethylmethacrylamide, N,N-di-tert-butylmethacrylamide, trimethylsilyl acrylate, N,N, dimethylacrylamide N,N-diisopropyl acrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers mentioned for the B blocks. In some embodiments, the A blocks may contain up to 10 mol percent, preferably they will contain only up to 5 mol percent, and particularly preferably only up to 2 mol percent of the vinyl aromatic monomers mentioned in the B blocks. However, in the most preferred embodiments, the A blocks will contain no vinyl monomers mentioned in the B blocks. Accordingly, the sulfonation level in the A blocks may be from 0 up to 15 mol percent of the total monomers in the A block. It will be understood by those skilled in the art that suitable ranges include any combination of the specified mol percents even if the specific combination and range is not listed herewith.

Each B block comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers noted immediately before, the B blocks may also comprise a hydrogenated copolymer of such monomer(s) with a conjugated diene selected from 1,3-butadiene, isoprene and mixtures thereof, having a vinyl content of between 20 and 80 mol percent. These copolymers with hydrogenated dienes may be random copolymers, tapered copolymers, block copolymers or controlled distribution copolymers. In one preferred embodiment, the B blocks are comprise a copolymer of conjugated dienes and the vinyl aromatic monomers noted in this paragraph wherein olefinic double bonds are hydrogenated. In another preferred embodiment, the B blocks are unsubstituted styrene monomer blocks which are aromatic by virtue of the nature of the monomer and do not require the added process step of hydrogenation. The B blocks having a controlled distribution structure are disclosed in U.S. Pat. No. 7,169,848. In one preferred embodiment, the B blocks are unsubstituted styrene blocks, since the polymer will not then require a separate hydrogenation step.

In another aspect, the modified block copolymer of the present disclosure includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof having a vinyl content prior to hydrogenation of between 20 and 80 mol percent and a number average molecular weight of between 1,000 and 50,000. In another embodiment, the impact modifier block D comprises an acrylate or silicone polymer having a number average molecular weight of 1,000 to 50,000. In still another embodiment, the D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that the ranges include any combination of the specified mol percents even if the specific combination and range is not listed herewith.

As for the B block which are free of olefinic double bonds, in one preferred embodiment the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are where each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been redissolved in tetrahydrofuran with a standardized solution of NaOH in a mixed alcohol and water solvent.

At typical levels of modification, each B block contains at least one functional group of formula (Ia) or (Ib). At preferred levels of modification, each B block contains from 10 to 100 mol percent of the functional groups based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer present in each B block, more preferably about 15 to 95 mol percent, or about 20 to 90, or about 25 to 80 mol percent of the functional groups. It will be understood by those skilled in the art that suitable ranges of sulfonation include any combination of the specified mol percents even if the specific combination and range is not listed herewith.

The functional groups which are present in the B blocks include moieties represented by formula (I)

wherein $R^1$ is a moiety $-(A^1-NR^a)_x R^b$ or a moiety $-(A^1-NR^a)_y-A^2-Z$; and $R^2$ is hydrogen, alkyl, or is one of the moieties $R^1$; or $R^3$ and $R^4$ together with the nitrogen to which they are bonded form an optionally substituted 5- to 7-membered ring consisting of 1-3 nitrogen, 2-6 carbon, and optionally 1 or 2 non-adjacent oxygen and/or sulfur ring atoms, x is 0, 1, 2 or 3;

y is 1 or 2;

$A^1$ and $A^2$, each independently, is straight chain alkylene optionally substituted by one or more methyl and/or ethyl groups;

$R^a$ and $R^b$, each independently, is hydrogen or alkyl;

Z is —$CO_2H$, —$SO_3H$ or —$P(O)(OH)_3$, as well as salts of such moieties.

Alkyl groups in the positions represented by $R^2$, $R^a$ and $R^b$ may be straight chain, branched or cyclic and generally may have from 1 to 15 carbon atoms. In some embodiments, $R^2$, $R^a$ or $R^b$ is $C_1$-$C_{15}$-alkyl, $C_3$-$C_{15}$-cycloalkyl, $C_3$-$C_{15}$-cycloalkyl-alkyl, or $C_3$-$C_{15}$-alkyl-cycloalkyl. In particular embodiments, each of $R^2$, $R^a$ or $R^b$ independently represents an alkyl group having from 1 to 12, or from 1 to 10, or from 1 to 8, or from 3 to 12, or from 3 to 10, or from 3 to 8, carbon atoms. In some embodiments, alkyl groups in the positions represented by $R^2$, $R^a$ and/or $R^b$ may be straight chain alkyl group having from 1 to 12, or from 1 to 10, or from 1 to 8, or from 3 to 12, or from 3 to 10, or from 3 to 8, carbon atoms.

Straight chain alkylene groups in the positions represented by $A^1$ and $A^2$ generally may have from 2 to 10, or from 2 to 8, or from 2 to 4, carbon atoms, e.g., ethylene, propylene, butylene, pentylene, hexylene, etc. The alkylene groups may optionally carry one or more methyl and/or ethyl substituents. In some embodiments, the alkylene groups carry one, two or three, or one or two, methyl substituents. In some particular embodiments the alkylene groups are unsubstituted.

Five- to seven-membered rings in the position represented by —$NR^1R^2$ generally may be formed from 5 to 7 ring atoms selected from the group consisting of 1-3 nitrogen atoms, 2-6 carbon atoms, 0-2 oxygen atoms and 0-2 sulfur atoms. Those having ordinary skill in the art will appreciate that oxygen and/or sulfur ring atoms are non-adjacent to one another, i.e., the rings do not contain —O—O—, —O—S— or —S—S— ring-segments. The rings may be saturated, partially unsaturated or aromatic.

Illustrative examples of five-membered rings in particular include pyrrole, 1,2-diazole, imidazole, 1,2,3-triazole, 1,2,4-triazole and 1,3,4-triazole, isoxazole, oxazole, oxadiazole (i.e., 1,2,3-oxadiazole, and 1,3,4-oxadiazole), isothiazole, thiazole, and thiadiazole (i.e., 1,2,3-thiadiazole, and 1,3,4-thiadiazole) rings as well as the dihydro-forms and the saturated counterparts thereof. Illustrative examples of six-membered rings in particular include piperidine (azinane), tetrahydro-1,2-diazine, tetrahydro-1,3-diazine, tetrahydro-1,4-diazine, tetrahydro-1,2-oxazine, tetrahydro-1,3-oxazine, tetrahydro-1,4-oxazine, tetrahydro-1,2-thiazine, tetrahydro-1,3-thiazine, tetrahydro-1,4-thiazine, tetrahydro-1,2,3-triazine, tetrahydro-1,2,4-triazine, tetrahydro-1,3,4-triazine, tetrahydro-1,3,5-triazine, tetrahydro-1,2,3-oxadiazine, tetrahydro-1,2,4-oxadiazine, tetrahydro-1,3,4-oxadiazine, tetrahydro-1,3,5-oxadiazine, tetrahydro-1,2,3-thiadiazine, tetrahydro-1,2,4-thiadiazine, tetrahydro-1,3,4-thiadiazine, tetrahydro-1,3,5-thiadiazine, as well as the corresponding dihydro-forms thereof. Illustrative examples of seven-membered rings in particular include azepane, 1,2-diazepane, 1,3-diazepane, 1,4-diazepane, 1,2-oxazepane, 1,3-oxazepane, 1,4-oxazepane, 1,2-thiazepane, 1,3-thiazepane, 1,4-thiazepane, 1,2,3-triazepane, 1,2,4-triazepane, 1,2,5-triazepane, 1,3,4-triazepane, 1,3,5-triazepane, 1,4,5-triazepane, 1,2,3-oxadiazepane, 1,2,4-oxadiazepane, 1,2,5-oxadiazepane, 1,3,4-oxadiazepane, 1,3,5-oxadiazepane, 1,4,5-oxadiazepane, 1,2,3-thiadiazepane, 1,2,4-thiadiazepane, 1,2,5-thiadiazepane, 1,3,4-thiadiazepane, 1,3,5-thiadiazepane, 1,4,5-thiadiazepane, as well as the partially or completely unsaturated forms thereof. The respective rings may be unsubstituted or may carry one or more substituents. In particular embodiments, the respective ring carries one, two or three alkyl substituents having from 1 to 12, or from 1 to 10, or from 1 to 8, or from 3 to 12, or from 3 to 10, or from 3 to 8, carbon atoms. In further embodiments, the respective ring carries one or two $C_1$-$C_3$-alkyl substituents and one alkyl substituent having from 1 to 12, or from 1 to 10, or from 1 to 8, or from 3 to 12, or from 3 to 10, or from 3 to 8, carbon atoms. In yet further embodiments, the respective ring carries one alkyl substituent having from 1 to 12, or from 1 to 10, or from 1 to 8, or from 3 to 12, or from 3 to 10, or from 3 to 8, carbon atoms.

In certain embodiments (I.1), each B block comprises a functional group of formula (I) wherein R1 and R2, together with the nitrogen to which they are bonded, form an optionally substituted imidazolium cation. Some of the embodiments (I.1) comprise the functional group of formula (Ib) wherein R1 and R2, together with the nitrogen to which they are bonded, form an imidazolium cation which carries one or two, in particular one, alkyl substituent having from 1 to 12, or from 1 to 10, or from 1 to 8, or from 3 to 12, or from 3 to 10, or from 3 to 8, carbon atoms.

In a particular group of the embodiments (I.1), each B block comprises as the functional group(s) a moiety or moieties:

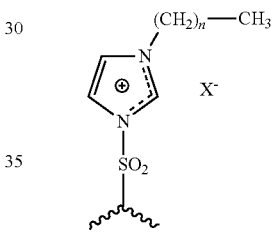

wherein n is 0 to 14, in particular 3 to 11, or 3 to 7, and $X^-$ is the anion of an inorganic or organic acid, in particular chloride or bromide.

In certain embodiments (I.2), each B block comprises a salt of a functional group of formula (Ib) wherein $R^1$ is a moiety -($A^1$-$NR^a$)$_x$$R^b$; and $R^2$ is hydrogen, or alkyl, in particular hydrogen or $C_1$-$C_{12}$-alkyl, or $C_3$-$C_{12}$-alkyl;

x is 0, 1, 2 or 3, in particular 1 or 2;

$A^1$, each independently, is straight chain alkylene, in particular $C_2$-$C_6$-alkylene, or $C_2$-$C_4$-alkylene, optionally substituted by one or more methyl and/or ethyl groups;

$R^a$ and $R^b$, each independently, is hydrogen or alkyl, in particular hydrogen or $C_1$-$C_{12}$-alkyl.

In some of the embodiments (I.2), the salt of the functional group is a $C_2$-$C_{15}$-alkyl halogenide of the functional group. In particular embodiments (I.2), the salt is a $C_3$-$C_{12}$-alkyl chloride, bromide or iodide.

In some of the embodiments (I.2), $R^2$ is hydrogen or methyl, and $R^1$ is -($A^1$-$NR^a$)$_x$$R^b$ wherein $A^1$ is $C_2$-$C_4$-alkylene, x is 1 or 2, $R^a$ is $C_1$-$C_2$-alkyl, $R^b$ is $C_1$-$C_{12}$-alkyl, and the salt is a $C_1$-$C_2$-alkyl chloride, or bromide.

In a particular group of the embodiments (I.2), each B block comprises as the functional group(s) a moiety or moieties:

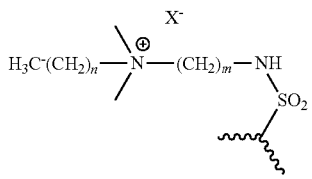

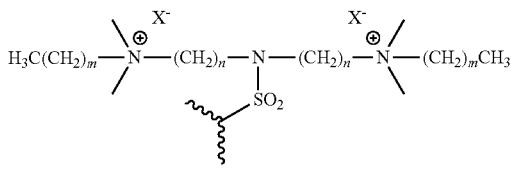

wherein n is 0 to 14, in particular 3 to 11, or 3 to 7, m is 2 to 6, in particular 2 to 4, and X⁻ is the anion of an inorganic or organic acid, in particular chloride or bromide.

In certain embodiments (I.3), each B block comprises a functional group of formula (I), or a salt thereof, wherein $R^1$ is a moiety -$(A^1$-$NR^a)_x R^b$; and $R^2$ is hydrogen, or alkyl, in particular hydrogen or $C_1$-$C_{12}$-alkyl, or $C_3$-$C_{12}$-alkyl;

x is 0, 1, 2 or 3, in particular 0 or 1;

$A^1$, each independently, is straight chain alkylene, in particular $C_2$-$C_6$-alkylene, or $C_2$-$C_4$-alkylene, optionally substituted by one or more methyl and/or ethyl groups; and $R^a$ and $R^b$, each independently, is hydrogen or alkyl, in particular hydrogen or $C_1$-$C_{12}$-alkyl.

In some of the embodiments (I.3), $R^1$ is hydrogen or methyl, and $R^2$ is -$(A^1$-$NR^a)_x R^b$ wherein $A^1$ is $C_2$-$C_4$-alkylene, x is 0 or 1, $R^a$ is $C_1$-$C_2$-alkyl, and $R^b$ is $C_1$-$C_{12}$-alkyl.

In a particular group of the embodiments (I.3), each B block comprises as the functional group(s) a moiety or moieties:

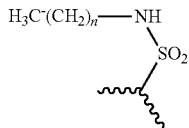

wherein n is 0 to 14, in particular 3 to 11, or 3 to 7.

In certain embodiments (I.4), each B block comprises a salt of a functional group of formula (I) or a salt thereof, wherein $R^1$ and $R^2$, each is a moiety -$(A^1$-$NR^a)_x R^b$;

x is 0, 1, 2 or 3, in particular 1 or 2;

$A^1$, each independently, is straight chain alkylene, in particular $C_2$-$C_6$-alkylene, or $C_2$-$C_4$-alkylene, optionally substituted by one or more methyl and/or ethyl groups; and $R^a$ and $R^b$, each independently, is hydrogen or alkyl, in particular hydrogen or $C_1$-$C_{12}$-alkyl.

In some of the embodiments (I.4), the salt of the functional group is an alkyl halogenide of the functional group. In particular embodiments (I.4), the salt is an alkyl chloride, bromide or iodide.

In some of the embodiments (I.4), $R^1$ and $R^2$ are identical.

In some of the embodiments (I.4) $R^1$ and $R^2$ are identical -$(A^1$-$NR^a)_x R^b$ moieties wherein $A^1$ is $C_2$-$C_4$-alkylene, x is 1 or 2, $R^a$ is $C_1$-$C_2$-alkyl, $R^b$ is $C_1$-$C_{12}$-alkyl, and the salt is an alkyl chloride, or bromide.

In a particular group of the embodiments (I.4), each B block comprises as the functional group(s) a moiety or moieties:

wherein m is 0 to 14, in particular 3 to 11, or 3 to 7, n is 2 to 6, in particular 2 to 4, and X⁻ is the anion of an inorganic or organic acid, in particular chloride or bromide.

In certain embodiments (I.5), each B block comprises a functional group of formula (I) or a salt thereof, wherein $R^1$ and $R^2$, each is a moiety -$(A^1$-$NR^a)_y$-$A^2$-Z;

y is 1 or 2, in particular 1;

$A^1$ and $A^2$, each independently, is straight chain alkylene, in particular $C_2$-$C_6$-alkylene, or $C_2$-$C_4$-alkylene, optionally substituted by one or more methyl and/or ethyl groups;

$R^a$, each independently, is hydrogen or alkyl, in particular hydrogen or $C_1$-$C_4$-alkyl; and Z is —$CO_2H$, —$SO_3H$ or —$P(O)(OH)_3$, in particular —$SO_3H$.

In some of the embodiments (I.5), $R^1$ and $R^2$ are identical.

In some of the embodiments (I.5) $R^1$ and $R^2$ are identical -$(A^1$-$NR^a)_y$-$A^2$-Z moieties wherein $A^1$ and $A^2$, each independently, is $C_2$-$C_4$-alkylene, y is 1, $R^a$ is $C_1$-$C_2$-alkyl, and Z is —$SO_3H$.

In a particular group of the embodiments (I.5), each B block comprises as the functional group(s) a moiety or moieties:

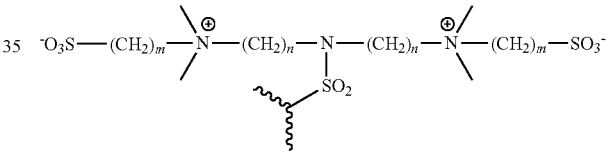

wherein m is 2 to 10, in particular 2 to 6, or 2 to 4, and n is 2 to 6, in particular 2 to 4.

2. Overall Anionic Process to Prepare Precursor Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the precursor block copolymers of the present invention include the initial monomers noted above. Other important starting materials for anionic co-polymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145.

Polymerization conditions to prepare the precursor block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. Nos. 6,391,981, 6,455,651 and 6,492,469. Related information is disclosed in U.S. Pat. Nos. 6,444,767 and 6,686,423. A precursor block copolymer made by such a moderated, anionic polymerization process can have the same structure as one prepared using the conventional anionic polymerization process and as such, this process can be useful in making the modified block copolymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) precursor block copolymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents are known in the art and can be used in preparing the coupled precursor block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped precursor block copolymers are prepared with polyalkenyl coupling agents as disclosed in, for example, U.S. Pat. Nos. 3,985,830, 4,391,949 and 4,444,953; as well as CA 716,645. Suitable polyalkenyl coupling agents include divinylbenzene, and preferably m-divinylbenzene. Preferred are tetraalkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear precursor block copolymers may also be prepared by a post-polymerization "coupling" step. However, unlike radial polymers, "n" in the above formulas is the integer 2, and is the remnant or residue of a coupling agent.

3. Process to Prepare Hydrogenated Precursor Polymers

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the precursor block copolymer to remove any ethylenic unsaturation prior to sulfonation. Hydrogenation generally improves thermal stability, ultraviolet light stability, oxidative stability, and, therefore, weatherability of the final polymer, and reduces of the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. Nos. 3,595,942, 3,634,549, 3,670,054, 3,700,633, and Re. 27,145. These methods operate to hydrogenate polymers containing ethylenic unsaturation and are based upon operation of a suitable catalyst. Such catalyst, or catalyst precursor, preferably comprises a Group 8 to 10 metal such as nickel or cobalt which is combined with a suitable reducing agent such as an aluminum alkyl or hydride of a metal selected from Groups 1, 2, and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid that an explosive mixture of oxygen and hydrocarbons is formed.

4. Process to Make Sulfonated Block Copolymers

According to the multiple embodiments disclosed herein, the precursor block copolymers are sulfonated to obtain a sulfonated block copolymer that is in solution and in micellar form.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core of the molecule, while the outer sulfonation resistant polymer block forms a shell which is solvated by a non-halogenated aliphatic solvent. In addition to forming discrete micelles, there may also be formation of polymer aggregates. Without being bound by any particular theory, polymer aggregates may be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

As described herein, micelles can be formed as a result of the sulfonation process, or alternatively, the precursor block copolymer may arrange in a micelle structure prior to sulfonation.

In some embodiments, for the formation of micelles, the sulfonation processes as described in WO 2008/089332 may be employed. The methods are useful for preparing sulfonated styrenic block copolymers as described in U.S. Pat. No. 7,737,224.

The precursor block copolymer can be sulfonated using a sulfonation reagent such as an acyl sulfate in at least one non-halogenated aliphatic solvent. In some embodiments, the precursor block copolymer can be sulfonated after being isolated, washed, and dried from the reaction mixture resulting from the production of the precursor polymer. In some other embodiments, the precursor block copolymer can be sulfonated without being isolated from the reaction mixture resulting from the production of the block polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the precursor block copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. A preferred example of the second non-halogenated aliphatic solvent is n-heptane.

The pre-formed polymer micelles and/or other polymer aggregates can allow that the sulfonation of the precursor polymer proceeds essentially without disabling gelling at considerably higher concentration than can be achieved without the addition of the second solvent. In addition, this approach can substantially improve the utility of more polar acyl sulfates, such as C3 acyl sulfate (propionyl sulfate), in terms of polymer sulfonation conversion rate and minimization of by-products. In other words, this approach may improve the utility of more polar sulfonation reagents. Such acyl sulfates are further described below.

b) Precursor Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted depends upon the composition of the precursor polymer, since the limiting concentration below which polymer gelling is non-disabling or negligible depends upon the polymer composition. As stated above, the limiting concentration may also depend on other factors such as the identity of the solvent or the solvent mixture used and the degree of sulfonation desired. Generally, the polymer concentration is within the range of from about 1%-wt. to about 30%-wt. alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percents even if the specific combination and range is not listed herewith.

In accordance with some embodiments of the presently described technology, the initial concentration of the precursor polymer or mixture of precursor polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified weight percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated block copolymer in some embodiments of the present technology, especially in a semi-batch or continuous production process, the total concentration of the polymers in the reaction mixture may be above the limiting concentration of the precursor polymer.

c) Sulfonation Agent

According to multiple embodiments, acyl sulfate may be used for sulfonating the precursor block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups which have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

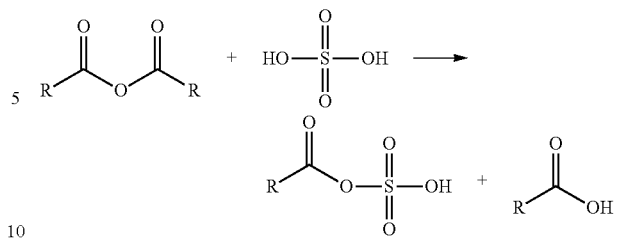

Acyl sulfates are subject to slow decomposition during the course of sulfonation reactions forming alpha-sulfonated carboxylic acids of the following formula:

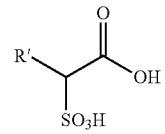

In one embodiment of the presently described technology, the acyl sulfate reagent is obtained from a carboxylic anhydride and sulfuric acid in a reaction that is conducted in a separate "pre-generation" reaction prior to addition to a solution of precursor polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

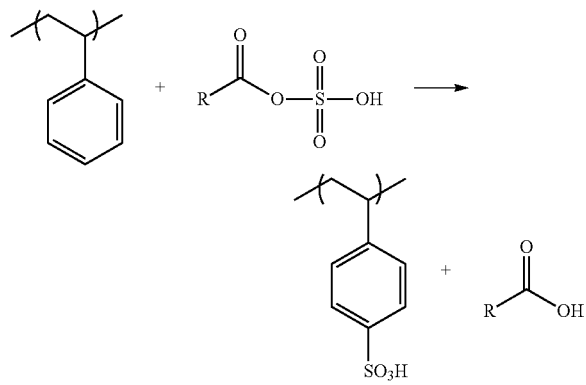

The acyl sulfate reagent may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to about 95 mol percent, alternatively from about 30 to about 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated block copolymer can be measured by NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been redissolved in tetrahydrofuran with a standardized solution of NaOH in a mixture of alcohol and water. In the latter case, it is preferred to ensure rigorous removal of by-product acids.

Although embodiments for sulfonating polymers are described above in the context of acyl sulfate reagents, the utility of other sulfonation reagents are also contemplated. For example, the use of those sulfonation reagents derived from the complexation/reaction of sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphosphoric acid, 1,4-dioxane, triethylamine, etc.

d) Reaction Conditions

The sulfonation reaction between the acyl sulfates and the precursor block copolymers such as aromatic-containing polymers can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

5. Process to Modify the Sulfonated Block Copolymers

According to multiple embodiments disclosed herein, the modified sulfonated block copolymers are prepared using a solution of the sulfonated block copolymer that is in solution and in micellar form.

As a result of sulfonation as disclosed above, the micelle cores contain sulfonation susceptible blocks having sulfonic acid and/or sulfonate functionality which are surrounded by an outer shell containing sulfonation resistant blocks of the block copolymer. The driving force for this phase segregation (causing the micelle formation) in solution has been attributed to the vast difference in polarity between the sulfonated segment of the block copolymer and the non-sulfonated blocks of the sulfonated block copolymer. The latter segments are freely solvated by a non-halogenated aliphatic solvent, for example the first solvent disclosed above. On the other hand, the sulfonated polymer moieties are concentrated in the core of micelle.

The modified sulfonated block copolymers in which the B block comprises a functional group of formula (I) are conveniently obtained by reacting a solution of the sulfonated block copolymer with an activating agent to activate the sulfonic acid or sulfonated ester group(s), and subsequently reacting the activated group(s) with a primary or secondary amine as schematically illustrated in the following reaction scheme:

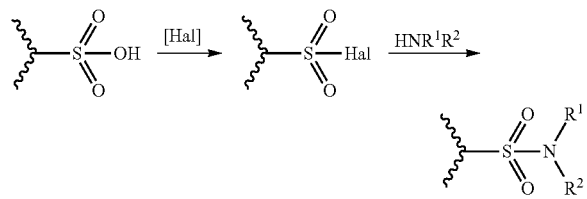

wherein [Hal] represents an activating agent, e.g., a halogenating agent, and Hal represents a leaving group, e.g., halogen, in particular chlorine or bromine. Essentially all activating or halogenating agents known to those of ordinary skill are suitable to activate the sulfonic acid or sulfonated ester group(s). Conveniently, the activating agent may be a halogenating agent, e.g., a thionyl halide such as thionyl chloride.

The amount of activating agent which is employed depends upon the moles of sulfonic acid or sulfonate ester groups present in the sulfonated block copolymer and on the desired level of modification. When the amount of the activating agent is less than about 80% of the stoichiometric amount with respect to the sulfonic acid or sulfonate ester groups present in the sulfonated block copolymer, the activating agent will normally react quantitatively. For levels of activation above about 80%, it has been found to be advantageous to employ the activating agent in excess. Normally, the activating agent may be employed in amounts ranging from about 50% to about 2000% of the stoichiometric amount with respect to the sulfonic acid or sulfonate ester functionalities of the sulfonated block copolymer.

In some embodiments the activating agent may be added in at least about 100%, particularly at least about 105%, more particularly at least about 110%, or at least about 120% of the stoichiometric amount with respect to the sulfonic acid or sulfonate ester groups present in the sulfonated block copolymer. Further, the activating agent may be added in at most about 200%, particularly at most about 175%, more particularly at most about 150%, or at most about 125%, of the stoichiometric amount with respect to the sulfonic acid or sulfonate ester groups present in the sulfonated block copolymer. It will be understood by those skilled in the art that suitable ranges include any combination of the specified stoichiometric amounts even if the specific combination and range is not listed herewith.

In some embodiments, the activating agent is generally used in an amount of from about 1.0 to about 2.0 equivalents of the activating agent per 1 equivalent of sulfonic acid or sulfonate ester group. In other embodiments there may be added 1.0 equivalents to about 2.0 equivalents of the activating agent per 1 equivalent of sulfonic acid or sulfonate ester group. In further embodiments, there may be added 1.0 equivalents to about 1.75 equivalents of the activating agent per 1 equivalent of sulfonic acid or sulfonate ester group. In still further embodiments, there may be added 1.0 equivalents to about 1.5 equivalents of the activating agent per 1 equivalent of sulfonic acid or sulfonate ester group. In additional embodiments, there may be added about 1.0 equivalent to about 1.3 equivalents of the activating agent per 1 equivalent of sulfonic acid or sulfonate ester group. It will be understood by those skilled in the art that suitable ranges include any combination of the specified equivalents even if the specific combination and range is not listed herewith.

The level of activation may be adjusted within broad ranges, e.g., from about 80% to about 100% of the sulfonic acid or sulfonate ester groups being activated by one equivalent of the activating agent per equivalent of sulfonic acid functionality in the block copolymer. In other embodiments the level of activation is at least about 90%, particularly at least about 95%, more particularly at least about 95% of the sulfonic acid or sulfonate ester groups being activated by one equivalent of the activating agent per equivalent of sulfonic acid functionality in the block copolymer. In some embodiments, at most about 95%, preferably at most about 99%, more particularly 100%, of the sulfonic acid or sulfonate ester groups are activated by one equivalent of the activating agent per equivalent of sulfonic acid functionality in the block copolymer.

In some of the embodiments, the level of activation may be higher where the sulfonated block copolymer has a lower degree of sulfonation, e.g., where the degree of sulfonation of the sulfonated block copolymer is in a range of from about 10 to about 70 mol %, the level of activation may be in a range of from 95 to 100%. In other embodiments, the level of activation may be lower where the sulfonated block copolymer has a higher degree of sulfonation, e.g., where the degree of sulfonation of the sulfonated block copolymer is in a range of about 85 to 100 mol %, the level of activation may be in a range of from about 90 to 100 mol %.

The activation reaction may normally be conducted at a temperature in the range of from room temperature (about 20° C.) to the boiling point of the solvent or solvent mixture. The reaction may be exothermic, i.e., may increase the temperature of the reaction medium by about to 20° C., depending on the nature of the activating agent, the amount per time in which the activating agent is added, and on the degree to which the block copolymer is sulfonated. In some of the embodiments, the reaction temperature may be in the range of from about 20° C. to about 100° C., or from about 20° C. to about 60° C.

The expression "reaction time" in this context is understood to be the interval of time starting when all of the reactants have been combined and ending when the activation reaction has reached completion. Generally, the reaction time may range from approximately less than 1 minute to approximately 24 hours or longer. Preferably, completion of the reaction is reached within about 1 hour, or within 30 minutes.

The activated sulfonated block copolymer may be separated from the reaction mixture by evaporating the reaction solvent(s) optionally at a reduced pressure and optionally at an elevated temperature. Preferably, the reaction mixture comprising the activated sulfonated block copolymers may be used without further processing to prepare the modified sulfonated block copolymers.

The amount of amine which is employed to obtain the modified sulfonated groups depends upon the moles of activated sulfonate groups present in the activated sulfonated block copolymer and on the desired level of modification. When the amount of the amine is less than about 80% of the stoichiometric amount with respect to activated sulfonate groups present in the sulfonated block copolymer, the amine will normally react quantitatively. For levels of modification above about 80%, it has been found to be advantageous to employ the amine in excess. Normally, the amine may be employed in amounts ranging from about 80% to about 2000% of the stoichiometric amount with respect to the activated sulfonate groups of the sulfonated block copolymer.

In some embodiments the amine may be added in at least about 80%, particularly at least about 100%, more particularly at least about 90%, or at least about 95% of the stoichiometric amount with respect to activated sulfonate groups present in the sulfonated block copolymer. Further, the amine may be added in at most about 200%, particularly at most about 175%, more particularly at most about 150%, or at most about 125% or at most about 115%, of the stoichiometric amount with respect to activated sulfonate groups present in the sulfonated block copolymer. It will be understood by those skilled in the art that suitable ranges include any combination of the specified stoichiometric amounts even if the specific combination and range is not listed herewith.

In some embodiments, the amine is generally used in an amount of from about 1.0 to about 2.0 equivalents of the amine per 1 equivalent of activated sulfonate group. In other embodiments there may be added 1.0 equivalents to about 1.75 equivalents of the amine per 1 equivalent of activated sulfonate group. In further embodiments, there may be added 1.0 equivalents to about 1.5 equivalents of the amine per 1 equivalent of activated sulfonate group. In still further embodiments, there may be added 1.0 equivalent to about 1.25 equivalents of the amine per 1 equivalent of activated sulfonate group. In additional embodiments, there may be added about 1.05 equivalents to about 1.25 equivalents of the amine per 1 equivalent of activated sulfonate group. It will be understood by those skilled in the art that suitable ranges include any combination of the specified equivalents even if the specific combination and range is not listed herewith.

The level of modification may be adjusted within broad ranges, e.g., from about 80% to about 100% of activated sulfonate groups being modified by one equivalent of the amine per equivalent of activated sulfonate groups in the block copolymer. In other embodiments the level of modification is at least about 90%, particularly at least about 95%, more particularly at least about 99% of activated sulfonate groups being modified by one equivalent of the amine per equivalent of activated sulfonate group in the block copolymer. In some embodiments, at most about 95%, preferably at most about 99%, more particularly 100%, of activated sulfonate groups are modified by one equivalent of the amine per equivalent of activated sulfonate group in the block copolymer.

In some of the embodiments, the level of modification may be higher where the sulfonated block copolymer has a lower degree of sulfonation, e.g., where the degree of sulfonation of the sulfonated block copolymer is in a range of from about 10 to about 70 mol %, the level of modification may be in a range of from 95 to 100%. In other embodiments, the level of modification may be lower where the sulfonated block copolymer has a higher degree of sulfonation, e.g., where the degree of sulfonation of the sulfonated block copolymer is in a range of about 85 to 100 mol %, the level of modification may be in a range of from about 90 to 100 mol %.

The modification reaction may normally be conducted at a temperature in the range of from room temperature (about 20° C.) to the boiling point of the solvent or solvent mixture. The reaction may be exothermic, i.e., may increase the temperature of the reaction medium by about 10 to 20° C., depending on the nature of the amine, the amount per time in which the amine is added, and on the degree to which the block copolymer is sulfonated. In some of the embodiments, the reaction temperature may be in the range of from about 20° C. to about 100° C., or from about 20° C. to about 60° C.

The expression "reaction time" in this context is understood to be the interval of time starting when all of the reactants have been combined and ending when the modification reaction has reached completion. Generally, the reaction time may range from approximately less than 1 minute to approximately 24 hours or longer. Preferably, completion of the reaction is reached within about 1 hour, or within 30 minutes.

The modified sulfonated block copolymer may be separated from the reaction mixture by evaporating the reaction solvent(s) optionally at a reduced pressure and optionally at an elevated temperature. In some embodiments, the reaction mixture comprising the modified sulfonated block copolymers may be used without further processing to cast films or membranes.

In other embodiments, the modified sulfonated block copolymer obtained in the foregoing manner further may be converted into a salt, e.g., by reaction with an alkyl halide ($R^{a'}$-Hal) corresponding to the following illustrative reaction scheme:

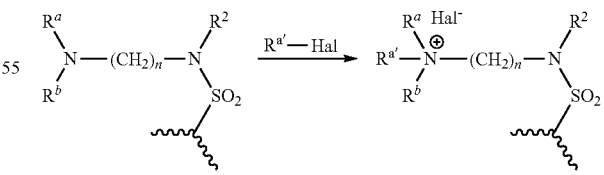

wherein $R^{a'}$ is a group $R^a$, preferably an alkyl group, and Hal has the meaning assigned in the foregoing.

The amount of alkyl halide which is employed when forming the salt depends upon the moles of amino groups present in the starting modified sulfonated block copolymer and on the desired level of quaternization. When the amount of the alkyl halide is less than about 80% of the stoichiometric amount with respect to the amino groups present in the starting modified sulfonated block copolymer, the alkyl halide will normally react quantitatively. For levels of conversion above about 80%, it has been found to be advantageous to employ the alkyl halide in excess. Normally, the alkyl halide may be employed in amounts ranging from about 50% to about 2000% of the stoichiometric amount with respect to the amino functionalities of the starting modified sulfonated block copolymer.

In some embodiments the alkyl halide may be added in at least about 100%, particularly at least about 105%, more particularly at least about 110%, or at least about 115% of the stoichiometric amount with respect to the amino groups present in the starting modified sulfonated block copolymer. Further, the alkyl halide may be added in at most about 200%, particularly at most about 175%, more particularly at most about 150%, or at most about 125%, of the stoichiometric amount with respect to the amino groups present in the starting modified sulfonated block copolymer. It will be understood by those skilled in the art that suitable ranges include any combination of the specified stoichiometric amounts even if the specific combination and range is not listed herewith.

In some embodiments, the alkyl halide is generally used in an amount of from about 1.0 to about 2.0 equivalents of the alkyl halide per 1 equivalent of amino groups. In other embodiments, there may be added 1.0 equivalents to about 1.75 equivalents of the alkyl halide per 1 equivalent of amino groups. In further embodiments, there may be added 1.0 equivalent to about 1.5 equivalents of the alkyl halide per 1 equivalent of amino groups. In still further embodiments, there may be added 1.0 equivalent to about 1.25 equivalents of the alkyl halide per 1 equivalent of amino groups. In additional embodiments, there may be added about 1.1 equivalents to about 1.25 equivalents of the alkyl halide per 1 equivalent of amino groups. It will be understood by those skilled in the art that suitable ranges include any combination of the specified equivalents even if the specific combination and range is not listed herewith.

The level of quaternization may be adjusted within broad ranges, e.g., from about 80% to about 100% of the amino groups may be quaternized by one equivalent of the alkyl halide per equivalent of amino functionality in the starting modified block copolymer. In other embodiments the level of quaternization is at least about 90%, particularly at least about 95%, more particularly at least about 98% of the amino groups being quaternized by one equivalent of the alkyl halide per equivalent of amino groups in the starting modified block copolymer. In some embodiments, at most about 95%, preferably at most about 99%, more particularly 100%, of the amino groups are quaternized by one equivalent of the alkyl halide per equivalent of amino groups in the starting modified block copolymer.

In some of the embodiments, the level of quaternization of the amino groups may be higher where the starting modified sulfonated block copolymer has a lower degree of sulfonation, e.g., where the degree of sulfonation of the sulfonated block copolymer is in a range of from about 10 to about 70 mol %, the level of quaternization may be in a range of from 95 to 100%. In other embodiments, the level of quaternization may be lower where the starting modified block copolymer has a higher degree of sulfonation, e.g., where the degree of sulfonation of the sulfonated block copolymer is in a range of about 85 to 100 mol %, the level of quaternization may be in a range of from about 90 to 100 mol %.

The salt normally forms at a temperature in the range of from room temperature (about 20° C.) to the boiling point of the solvent or solvent mixture. The reaction may be exothermic, i.e., may increase the temperature of the reaction medium by about 10 to 20° C., depending on the nature of the alkyl halide, the amount per time in which the alkyl halide is added, and on the degree to which the block copolymer is sulfonated. In some of the embodiments, the reaction temperature may be in the range of from about 20° C. to about 100° C., or from about 20° C. to about 60° C.

The expression "reaction time" in this context is understood to be the interval of time starting when all of the reactants have been combined and ending when the quaternization reaction has reached completion. Generally, the reaction time may range from approximately less than 1 minute to approximately 24 hours or longer. Preferably, completion of the reaction is reached within about 1 hour, or within 30 minutes.

The quaternized modified sulfonated block copolymer may be separated from the reaction mixture by evaporating the reaction solvent(s) optionally at a reduced pressure and optionally at an elevated temperature. In some embodiments, the reaction mixture comprising the quaternized modified sulfonated block copolymers may be used without further processing to cast films or membranes.

In even further embodiments, the modified sulfonated block copolymer obtained in the foregoing manner may be converted into an internal salt (zwitter-ionic functional group), e.g., by reaction with a cyclic ester corresponding to the following illustrative reaction scheme:

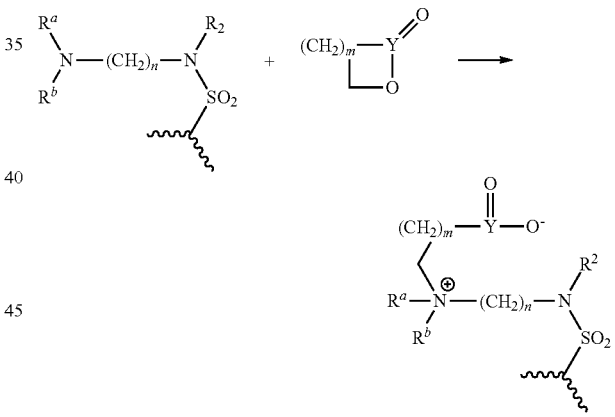

wherein n is an integer from 1 to 15, preferably 2, 3, 4 or 5, m is an integer from 0 to 14, preferably 2, 3, 4 or 5, and Y represents in particular C or S(=O).

The amount of cyclic ester which is employed when forming the internal salt depends upon the moles of amino groups present in the starting modified sulfonated block copolymer and on the desired level of salt formation. When the amount of the cyclic ester is less than about 80% of the stoichiometric amount with respect to the amino groups present in the starting modified sulfonated block copolymer, the cyclic ester will normally react quantitatively. For levels of conversion above about 80%, it has been found to be advantageous to employ the cyclic ester in excess. Normally, the cyclic ester may be employed in amounts ranging from about 50% to about 2000% of the stoichiometric amount with respect to the amino functionalities of the starting modified sulfonated block copolymer.

In some embodiments the cyclic ester may be added in at least about 100%, particularly at least about 105%, more particularly at least about 110%, or at least about 115% of the stoichiometric amount with respect to the amino groups present in the starting modified sulfonated block copolymer. Further, the cyclic ester may be added in at most about 200%, particularly at most about 175%, more particularly at most about 150%, or at most about 125%, of the stoichiometric amount with respect to the amino groups present in the starting modified sulfonated block copolymer. It will be understood by those skilled in the art that suitable ranges include any combination of the specified stoichiometric amounts even if the specific combination and range is not listed herewith.

In some embodiments, the cyclic ester is generally used in an amount of from about 1.0 to about 2.0 equivalents of the cyclic ester per 1 equivalent of amino groups. In other embodiments, there may be added 1.0 equivalents to about 1.75 equivalents of the cyclic ester per 1 equivalent of amino groups. In further embodiments, there may be added 1.0 equivalent to about 1.5 equivalents of the cyclic ester per 1 equivalent of amino groups. In still further embodiments, there may be added 1.0 equivalents to about 1.25 equivalents of the cyclic ester per 1 equivalent of amino groups. In additional embodiments, there may be added about 1.1 equivalents to about 1.25 equivalents of the cyclic ester per 1 equivalent of amino groups. It will be understood by those skilled in the art that suitable ranges include any combination of the specified equivalents even if the specific combination and range is not listed herewith.

The level of salt formation may be adjusted within broad ranges, e.g., from about 80% to about 100% of the amino groups may be converted by one equivalent of the cyclic ester per equivalent of amino functionality in the starting modified block copolymer. In other embodiments the level of salt formation is at least about 90%, particularly at least about 95%, more particularly at least about 98% of the amino groups being converted by one equivalent of the cyclic ester per equivalent of amino groups in the starting modified block copolymer. In some embodiments, at most about 95%, preferably at most about 99%, more particularly 100%, of the amino groups are converted by one equivalent of the cyclic ester per equivalent of amino groups in the starting modified block copolymer.

In some of the embodiments, the level of conversion of the amino groups to the corresponding salts may be higher where the starting modified sulfonated block copolymer has a lower degree of sulfonation, e.g., where the degree of sulfonation of the sulfonated block copolymer is in a range of from about 10 to about 70 mol %, the level of salt formation may be in a range of from 95 to 100%. In other embodiments, the level of conversion may be lower where the starting modified block copolymer has a higher degree of sulfonation, e.g., where the degree of sulfonation of the sulfonated block copolymer is in a range of about 85 to 100 mol %, the level of salt formation may be in a range of from about 95 to 100 mol %.

The internal salt (zwitter ionic functional group) normally forms at a temperature in the range of from room temperature (about 20° C.) to the boiling point of the solvent or solvent mixture. The reaction may be exothermic, i.e., may increase the temperature of the reaction medium by about 10 to 20° C., depending on the nature of the cyclic ester, the amount per time in which the cyclic ester is added, and on the degree to which the block copolymer is sulfonated. In some of the embodiments, the reaction temperature may be in the range of from about 20° C. to about 100° C., or from about 20° C. to about 60° C.

The expression "reaction time" in this context is understood to be the interval of time starting when all of the reactants have been combined and ending when the internal salt formation reaction has reached completion. Generally, the reaction time may range from approximately less than 1 minute to approximately 24 hours or longer. Preferably, completion of the reaction is reached within about 1 hour, or within 30 minutes.

The internal salt of the modified sulfonated block copolymer may be separated from the reaction mixture by evaporating the reaction solvent(s) optionally at a reduced pressure and optionally at an elevated temperature. In some embodiments, the reaction mixture comprising the internal salt of the modified sulfonated block copolymers may be used without further processing to cast films or membranes.

In an alternative procedure, internal salts of the modified block copolymers may be prepared by reacting a starting modified sulfonated block copolymer with a functionalized ester and subsequent hydrolysis of the intermediate salt corresponding to the following illustrative reaction scheme:

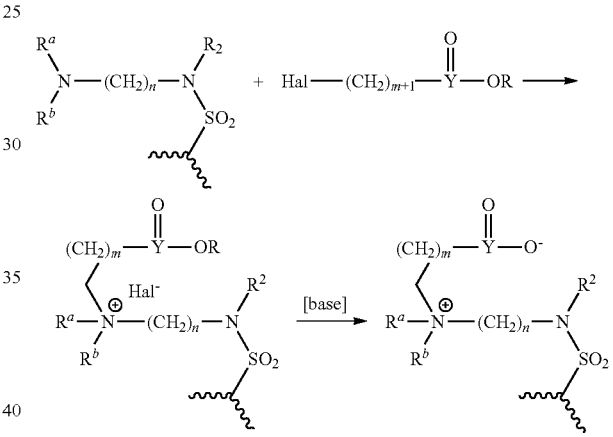

wherein n is an integer from 2 to 15, preferably 2 to 8, or 2 to 6, m is an integer from 1 to 14, preferably 1 to 7, or 1 to 5, Y represents C, S(=O) or P(=O)(OR)$_2$, R is a methyl or ethyl group, and Hal has the meaning assigned in the foregoing.

The amount of functionalized ester which is employed when forming the internal salt depends on the moles of amino groups present in the starting modified sulfonated block copolymer and on the desired level of salt formation. When the amount of the functionalized ester is less than about 80% of the stoichiometric amount with respect to the amino groups present in the starting modified sulfonated block copolymer, the functionalized ester will normally react quantitatively. For levels of conversion above about 80%, it has been found to be advantageous to employ the functionalized ester in excess. Normally, the functionalized ester may be employed in amounts ranging from about 50% to about 2000% of the stoichiometric amount with respect to the amino functionalities of the starting modified sulfonated block copolymer.

In some embodiments the functionalized ester may be added in at least about 100%, particularly at least about 105%, more particularly at least about 110%, or at least about 115% of the stoichiometric amount with respect to the amino groups present in the starting modified sulfonated block copolymer. Further, the functionalized ester may be added in at most about 200%, particularly at most about 175%, more particularly at most about 150%, or at most about 125%, of the stoichiometric amount with respect to the amino groups present in the starting modified sulfonated block copolymer. It will be understood by those skilled in the art that suitable ranges include any combination of the specified stoichiometric amounts even if the specific combination and range is not listed herewith.

In some embodiments, the functionalized ester is generally used in an amount of from about 1.0 to about 2.0 equivalents of the functionalized ester per 1 equivalent of amino groups. In other embodiments, there may be added 1.0 equivalents to about 1.75 equivalents of the functionalized ester per 1 equivalent of amino groups. In further embodiments, there may be added 1.0 equivalent to about 1.5 equivalents of the functionalized ester per 1 equivalent of amino groups. In still further embodiments, there may be added 1.0 equivalents to about 1.25 equivalents of the functionalized ester per 1 equivalent of amino groups. In additional embodiments, there may be added about 1.05 equivalents to about 1.2 equivalents of the functionalized ester per 1 equivalent of amino groups. It will be understood by those skilled in the art that suitable ranges include any combination of the specified equivalents even if the specific combination and range is not listed herewith.

The level of salt formation may be adjusted within broad ranges, e.g., from about 80% to about 100% of the amino groups may be converted by one equivalent of the functionalized ester per equivalent of amino functionality in the starting modified block copolymer. In other embodiments the level of salt formation is at least about 90%, particularly at least about 95%, more particularly at least about 98% of the amino groups being converted by one equivalent of the functionalized ester per equivalent of amino groups in the starting modified block copolymer. In some embodiments, at most about 95%, preferably at most about 99%, more particularly 100%, of the amino groups are converted by one equivalent of the functionalized ester per equivalent of amino groups in the starting modified block copolymer.

In some of the embodiments, the level of conversion of the amino groups to the corresponding salts may be higher where the starting modified sulfonated block copolymer has a lower degree of sulfonation, e.g., where the degree of sulfonation of the sulfonated block copolymer is in a range of from about 10 to about 70 mol %, the level of salt formation may be in a range of from 95 to 100%. In other embodiments, the level of conversion may be lower where the starting modified block copolymer has a higher degree of sulfonation, e.g., where the degree of sulfonation of the sulfonated block copolymer is in a range of about 85 to 100 mol %, the level of salt formation may be in a range of from about 90 to 100 mol %.

The intermediate salt normally forms at a temperature in the range of from room temperature (about 20° C.) to the boiling point of the solvent or solvent mixture. The reaction may be exothermic, i.e., may increase the temperature of the reaction medium by about 10 to 20° C., depending on the nature of the functionalized ester, the amount per time in which the functionalized ester is added, and on the degree to which the block copolymer is sulfonated. In some of the embodiments, the reaction temperature may be in the range of from about 20° C. to about 100° C., or from about 20° C. to about 60° C.

The expression "reaction time" in this context is understood to be the interval of time starting when all of the reactants have been combined and ending when the intermediate salt formation reaction has reached completion. Generally, the reaction time may range from approximately less than 1 minute to approximately 24 hours or longer. Preferably, completion of the reaction is reached within about 1 hour, or within 30 minutes.

The intermediate salt may be separated from the reaction mixture by evaporating the reaction solvent(s) optionally at a reduced pressure and optionally at an elevated temperature. Preferably, the reaction mixture comprising the intermediate salt may be used without further processing to cast a membrane or film, or to produce the internal salt (zwitter ionic functional group).

The intermediate salt may be converted to the internal salt by hydrolysis with a base. Suitable bases are in particular the oxides or hydroxides of alkali metals and alkaline earth metals. Conveniently, sodium hydroxide is used as a base.

The amount of base which is employed for hydrolysis is not critical, and the base generally is employed in excess, relative to the ester groups to be hydrolyzed. Conveniently, the hydrolysis of the ester groups is achieved by adding an aqueous solution of the base to the reaction mixture comprising the intermediate salt. The concentration of the base in the aqueous solution generally is not critical and may range from 0.1 molar to 10 molar, or from 0.5 molar to molar.

The hydrolysis reaction normally takes place at a temperature in the range of from room temperature (about 20° C.) to the boiling point of the solvent or solvent mixture. The reaction may be exothermic, i.e., may increase the temperature of the reaction medium by about to 20° C., depending on the nature of the functionalized ester, the amount per time in which the functionalized ester is added, and on the degree to which the block copolymer is sulfonated. In some of the embodiments, the reaction temperature may be in the range of from about 20° C. to about 100° C., or from about 20° C. to about 60° C.

The expression "reaction time" in this context is understood to be the interval of time starting when all of the reactants have been combined and ending when the hydrolyzation has reached completion. Generally, the reaction time may range from approximately less than 1 minute to approximately 24 hours or longer. Preferably, completion of the reaction is reached within about 1 hour, or within 30 minutes.

The internal salt (zwitter ion modified block copolymer) may be separated from the reaction mixture by evaporating the reaction solvent(s) optionally at a reduced pressure and optionally at an elevated temperature. In some embodiments, the reaction mixture comprising the internal salt of the modified sulfonated block copolymer may be used without further processing to cast films or membranes.

6. Films or Membranes of the Modified Block Copolymers

The modified block copolymers of the present disclosure are particularly suited as materials for films or membranes, including coatings. Such films or membranes may be obtained by a) providing a composition comprising the modified sulfonated block copolymer in a liquid phase comprising one or more aprotic organic solvents,
b) casting the composition, and
c) evaporating the liquid phase.

The nature and composition of the liquid phase is generally not critical so long as aprotic organic solvent or solvents is or are capable to dissolve or disperse the modified block copolymer to a degree which is sufficient to achieve a coating or film-casting composition of adequate homogeneity.

Suitable aprotic organic solvents include, e.g., optionally halogenated hydrocarbons having from 4 to 12 carbon atoms. The hydrocarbons may be straight-chain, branched or mono- or polycyclic and may comprise straight-chain, branched as well as mono- or polycyclic, optionally aromatic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, benzene, toluene and xylenes, and the like.

In some particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further particular embodiments, the apolar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

In yet further embodiments, the liquid phase is composed of at least two solvents selected from polar solvents and one non-polar solvents.

Preferably, the polar solvents are selected from water, alcohols having from 1 to 20 carbon atoms, preferably from 1 to 8 carbon atoms, more preferably from 1 to 4 carbon atoms; ethers having from 1 to 20 carbon atoms, preferably from 1 to 8 carbon atoms, more preferably from 1 to 4 carbon atoms, including cyclic ethers; esters of carboxylic acids, esters of sulfuric acid, amides, carboxylic acids, anhydrides, sulfoxides, nitriles, and ketones having from 1 to 20 carbon atoms, preferably from 1 to 8 carbon atoms, more preferably from 1 to 4 carbon atoms, including cyclic ketones. More specifically, the polar solvents are selected from methanol, ethanol, propanol, isopropanol, dimethyl ether, diethyl ether, dipropyl ether, dibutyl ether, substituted and unsubstituted furans, oxetane, dimethyl ketone, diethyl ketone, methyl ethyl ketone, substituted and unsubstituted tetrahydrofuran, methyl acetate, ethyl acetate, propyl acetate, methylsulfate, dimethylsulfate, carbon disulfide, formic acid, acetic acid, sulfoacetic acid, acetic anhydride, acetone, cresol, creosol, dimethylsulfoxide (DMSO), cyclohexanone, dimethyl acetamide, dimethyl formamide, acetonitrile, water and dioxane, with water, tetrahydrofuran, methanol, ethanol, acetic acid, sulfoacetic acid, methylsulfate, dimethylsulfate, and IPA being the more preferred of the polar solvents.

Preferably the non-polar solvents are selected from toluene, benzene, xylene, mesitylene, hexanes, heptanes, octanes, cyclohexane, chloroform, dichloroethane, dichloromethane, carbon tetrachloride, triethylbenzene, methylcyclohexane, isopentane, and cyclopentane, with toluene, cyclohexane, methylcyclohexane, cyclopentane, hexanes, heptanes, isopentane, and dichloroethane being the most preferred non-polar solvents. As noted, the method utilizes two or more solvents.

This means that two, three, four or more solvents selected from polar solvents alone, non-polar solvents alone or a combination of polar solvents and non-polar solvents may be used. The ratio of the solvents to one another can vary widely. For example, in solvent mixtures having two solvents, the ratio can range from 99.99:0.01 to 0.01:99.9.

The concentration of the modified block copolymer(s) in the liquid phase depends on the nature of the modified block copolymer(s) and on factors such as the identity of the solvent or the solvent mixture. Generally, the polymer concentration falls within a range of from about 1%-wt. to about 40%-wt., alternatively from about 2%-wt. to about 35%-wt., alternatively from about 3%-wt. to about 30%-wt., or a range of from about 1%-wt. to about 30%-wt., alternatively from about 2%-wt. to about 25%-wt., alternatively from about 5%-wt. to about 20%-wt., based on the total weight of the solution of dispersion of the modified block copolymer(s). It will be understood by those skilled in the art that suitable ranges include any combination of the specified weight percents even if the specific combination and range is not listed herewith.

The dispersion or solution of the modified block copolymer(s) in the liquid phase to obtain the composition (a) is achieved, for example, by combining requisite amounts of the modified block copolymer(s) and the solvent or solvents at a temperature of from about 20° C. to the boiling point of the employed solvent or solvents. In general, the temperature is in a range of from about 20° C. to about 100° C., alternatively from about 20° C. to about 80° C., alternatively from about 20° C. to about 60° C., alternatively from about 25° C. to about 65° C., alternatively from about 25° C. to about 60° C. (e.g., at about 50° C.). The dispersing or dissolution time to obtain a composition of sufficient homogeneity can be in the range of from approximately less than 1 minute to approximately 24 hours or longer, dependent on the temperature and the molecular weight of the polymer.

Those having ordinary skill will appreciate that the quality of the film or membrane may be influenced by the homogeneity of the composition (a). Thus, admixture of the modified block copolymer in the liquid phase advantageously may be aided by means of suitable mixing equipment or homogenizers known in the art. In most embodiments, conventional tank or pipe mixing procedures will be suited to obtain a composition of adequate homogeneity. In some embodiments it may be advantageous to homogenize the composition (a) in a conventional homogenizer. Those having skill in the art will appreciate that the thoroughness of mixing may also be facilitated by decreasing the concentration of the modified block copolymer. The choice of suitable equipment and concentrations will generally depend on ecologic and economic factors.

The compositions (a) generally may have a solids content up to about 70%-wt. although the films and membranes may not necessarily be prepared from compositions having the highest levels of solids. However, compositions (a) in which the solids levels and the concentrations are as high as possible are advantageous for storage or transport to minimize storage volume and shipping costs. Also, storage- and/or transport-grade compositions (a) can desirably be diluted prior to final use to a solids content or viscosity level which is suited for the purposes of a particular application. The thickness of the films or membranes to be prepared and the method of applying the composition to a substrate will usually dictate the solids level of the dispersion and the viscosity of the solution. Generally, when preparing films or membranes from a composition (a), the solids content will be from 5 to about 60%-wt., preferably from about 10 to about 50%-wt., or from about 15 to about 45%-wt.

The thickness of the films and membranes, including coatings, for the applications described herein is not critical and usually will depend upon the target application of the films, membranes and coatings. Normally, the films and membranes may have a thickness of at least about 0.5 μm and at most about 1000 μm. Typically, the thickness will range from about 1 to about 200 μm, e.g., from about 5 to about 100 μm, or from about 15 to about 35 μm.

Substrates which may be coated with the composition (a) include natural and synthetic, woven and non-woven materials as well as substrates made of one or more of such materials. The shape and form of the substrate may vary broadly, and include fibers, films, textiles, leather and wood parts or constructs.

Essentially, any fibrous material can be coated, impregnated or otherwise treated with the compositions (a) by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The methods available for manufacturing such coated articles are in principle known in the art and include, for example, spray coating, elecro-coating, direct coating, transfer coating, and a number of different film lamination processes. In a direct coating method, the composition (a) is cast onto the appropriate substrate, usually a textile, and subsequently dried, and optionally cured or crosslinked, e.g. under controlled conditions of temperature and dwell time or throughput. This provides a coated layer comprising the modifies block copolymer on the substrate. The coated layer is typically non-microporous.

In this method, the coated layer may be provided either directly on the substrate, or the substrate may comprise one or more additional layers, e.g. polymer layers, on its surface. Moisture-vapor permeable tie or base coats and intermediate layers may, for example, be present on the substrate surface. For instance, the substrate may be a textile having a layer of foamed, microporous or hydrophilic polymer. Thus, multi-layer coatings having several coated layers (and/or film layers) are provided. In some embodiments, the coating layer comprising the modified block copolymer is provided as the outermost layer.

In a transfer coating method, the composition (a) is cast onto a removable release substrate, e.g. release paper and then dried and optionally cured to provide a film or membrane on the release substrate. The film or membrane is typically non-microporous. The release substrate is, for example, a siliconised paper or blanket. The film or membrane may be stored and/or transported in this format prior to further use, or the release substrate may be removed prior to storage or use.

The film or membrane can typically then be bonded to a substrate material using thermal energy, or by using a layer of adhesive. The layer of adhesive may be applied to either the film or membrane, or to the substrate material or to both. The adhesive layer may be either continuous or discontinuous and typically comprises a foamed, microporous or hydrophilic polymer formulation. The release substrate is removed either before or after application of the film or membrane to the material.

In the foregoing manner, directly coated layers as well as multi-layer coatings may be produced. For example, the film which is applied to the material may be a pre-formed multi-layer film, and/or additional layers may be present on the material prior to application of the film of the disclosure. These additional layers may be moisture-vapor permeable tie or base coats and intermediate layers. Thus, multi-layer films, and materials coated with multiple film layers (and/or coated layers), are provided. Typically, the film layer comprising the polymer of the disclosure is provided as the innermost layer.

Combinations of one or more inner layers comprising a coating according to the present disclosure with conventional, less hydrophobic layers may be anisotropic, and may show a directional effect of moisture-vapor flow on the water vapor resistance. This effect is most obvious in bi- and multilayer systems, and the magnitude of the effect is significant in the context of the overall breathability of the materials. Synergy may be observed when the vapor flow occurs first through the film in accordance with the present disclosure, which results in lower than expected water vapor resistance values for the composite. Conversely, vapor flow that occurs first through a less hydrophobic layer may have an undermining effect on the layer comprising a coating according to the present disclosure, which results in higher than expected water vapor resistance values. This additional control feature for moisture-vapor flow may be usefully incorporated into the design of multilayer films, other materials such as coated fabrics and end products such as garments.

7. Properties of the Modified Block Copolymers

According to several embodiments, the modified sulfonated block copolymers disclosed herein is has been found that modifying the sulfonated block copolymer has a surprising impact on the performance of membranes comprising these block copolymers. For example, in some embodiments, the water uptake of membranes comprising the modified block copolymers is significantly lower than the water uptake of membranes comprising the corresponding sulfonated block copolymers. The reduced tendency of the membranes comprising the modified sulfonated block copolymers to take up water results in a distinctly improved dimensional stability of the membranes upon immersion in water as compared to membranes comprising the sulfonated block copolymer. In some embodiments, membranes comprising the modified block copolymers exhibit an exceptionally high level of ion conductivity. In particular embodiments, the ion transport through the membrane is high in spite of the low tendency to take up water. In some embodiments, the membranes exhibit high specific conductivity, high selectivity for cation transport, and low swelling on exposure to water.

It has been found that modifying the sulfonated block copolymers improves the tensile modulus of the sulfonated block copolymers as compares to the corresponding sulfonated block copolymers. In other words, the modified block copolymer exhibits a lower tensile modulus in the dry state than a corresponding sulfonated block copolymer. As a result, when immersed in water, the modified block copolymer exhibits a wet tensile modulus which is essentially the same or only slightly lower than the modulus in the dry state. Therefore, according to some embodiments, in both wet and dry states, the modified block copolymer will have the same or a similar modulus. The modified block copolymers, thus, retain their softness and drape performance independent of the humidity of the environment. It has also surprisingly been found that in addition to these properties, the modified block copolymers also exhibit high water vapor transport rates and very good dimensional stability.

Accordingly, in some embodiments, the dry tensile modulus of the modified block copolymer is equal to or less than that of the corresponding sulfonated block copolymer. In other embodiments the dry tensile modulus of the modified block copolymer is decreased to the range of from 10% to 99% of the tensile modulus of the corresponding sulfonated block copolymer. In other embodiments, the dry tensile modulus of the modified block copolymer is decreased to the range of from 50% to 95% of the tensile modulus of the corresponding sulfonated block copolymer. In further embodiments, the dry tensile modulus of the modified block copolymer is decreased to the range of from 60% to 90% of the tensile modulus of the corresponding sulfonated block copolymer. In still further embodiments, the dry tensile modulus of the modified block copolymer is decreased to the range of from 65% to 80% of the tensile modulus of the corresponding sulfonated block copolymer. In even further embodiments, the dry tensile modulus of the modified block copolymer is decreased to the range of from 70% to 75% of the tensile modulus of the corresponding sulfonated block copolymer. It will be understood by those skilled in the art that suitable ranges include any combination of the specified percentages even if the specific combination and range is not listed herewith.

Furthermore, the tensile modulus of the modified block copolymer may be the same or similar in both the wet and dry states. Accordingly, in some embodiments, the modified block copolymer disclosed herein has a wet tensile modulus that is not less than 20% of the dry tensile modulus. In other embodiments, the wet tensile modulus of the modified block copolymer is not less than 35% of the dry tensile modulus. In additional embodiments, the wet tensile modulus of the modified block copolymer is not less than 50% of the dry tensile modulus. In other embodiments, the wet tensile modulus of the modified block copolymer is not less than 65% of the dry tensile modulus. In further embodiments, the wet tensile modulus is not less than 75% of the dry tensile modulus. In still further embodiments, the wet tensile modulus of the modified block copolymer is not less than 85% of the dry tensile modulus. In other embodiments, the wet tensile modulus of the modified block copolymer is not less than 90% of the dry tensile modulus. In other embodiments, the wet tensile modulus of the modified block copolymer is not less than 95% of the dry tensile modulus. It will be understood by those skilled in the art that suitable ranges include any combination of the specified percentages even if the specific combination and range is not listed herewith.

Furthermore, in some embodiments, the wet tensile strength at break of the modified block copolymer is at least about 50% of the dry tensile strength at break. In other embodiments, the wet tensile strength at break of the modified block copolymer is at least about 75% of the dry tensile strength at break. In further embodiments, the wet tensile strength at break of the modified block copolymer is at least about 90% of the dry tensile strength at break. In further embodiments, the wet tensile strength at break of the modified block copolymer is at about the same as the dry tensile strength at break. It will be understood by those skilled in the art that suitable ranges include any combination of the specified percentages even if the specific combination and range is not listed herewith.

It has also been found that the modified block copolymers disclosed herein have surprisingly high water vapor transport rates while at the same time having very good dimensional stability. It was surprisingly found that the water vapor transport rate (WVTR) of the modified block copolymers may be the same or similar to the WVTR of a corresponding sulfonated block copolymer, and in some embodiments may have a higher WVTR. Accordingly, in some embodiments the WVTR of the modified block copolymer is at least about 50% of the WVTR of a corresponding sulfonated block copolymer. In other embodiments, the WVTR is at least about 65% of the WVTR of a corresponding sulfonated block copolymer. In further embodiments, the WVTR is at least about 75% of the WVTR of a corresponding sulfonated block copolymer. In still further embodiments, the WVTR is at least about 85% of the WVTR of a corresponding sulfonated block copolymer. In even further embodiments, the WVTR is at least about 90% of the WVTR of a corresponding sulfonated block copolymer. In additional embodiments, the WVTR is at least about 95% of the WVTR of a corresponding sulfonated block copolymer. In further embodiments, the WVTR is at least about 99% of the WVTR of a corresponding sulfonated block copolymer. It will be understood by those skilled in the art that suitable ranges include any combination of the specified percentages even if the specific combination and range is not listed herewith.

In some embodiments, the WVTR may also be quantified using the inverted cup method in terms of g/m2/day which is the amount of water in grams which is transported through the membrane into a 50% relative humidity atmosphere at 25° C. using a membrane having 1 m2 of exposed area and 1 mil of thickness in a day of exposure. Accordingly, in some embodiments the modified block copolymer has a WVTR of at least about 1000 g/m2/day. In other embodiments, the WVTR is at least about 2500 g/m2/day. In further embodiments, the WVTR is at least about 10,000 g/m2/day. In even further embodiments, the WVTR is at least about 15,000 g/m2/day. In still further embodiments, the WVTR is at least about 20,000 g/m2/day. It will be understood by those skilled in the art that suitable ranges include any combination of the specified rates even if the specific combination and range is not listed herewith.

It has been surprisingly found that the modified block copolymers exhibit a high WVTR while also maintaining very good dimensional stability. Dimensional stability can refer to the overall physical shape of a membrane or article comprising the modified block copolymer. Thus, polymers with good dimensional stability are more likely to maintain their form, and are less likely to sag or change shape in the presence of water. While there are a number of ways to measure the dimensional stability of a block copolymer, including measuring the length, width, and thickness of a membrane in both wet and dry states, one method includes measuring the water uptake of the block copolymer membrane.

Accordingly, the expression "water uptake value" as used herein refers to the weight of water which is absorbed by a block copolymer in equilibrium as compared to the original weight of the dry block copolymer, and is calculated as a percentage. A lower water uptake value indicates that less water has been absorbed and therefore corresponds to a better dimensional stability.

The surprising and advantageous dimensional stability is desirable in water management membranes, i.e., in applications where a membrane is constrained in a mounting device and small changes in the dimensions of the membrane may cause buckling and tearing, thereby inevitably causing the performance of the device to degrade or even fail. The surprising and advantageous dimensional stability is also desirable, for example, for desalination applications, humidity regulation devices, battery separators, fuel cell exchange membranes, medical tubing applications, various electrically driven ion-transport processes, and the like.

In some embodiments, the water uptake value of a modified block copolymer is equal to or less than the water uptake value of a corresponding sulfonated block copolymer. In other embodiments, the water uptake value is less than 80% the water uptake value of the corresponding block copolymer. In further embodiments, the water uptake value is less than 50% the water uptake value of the corresponding block copolymer. In further embodiments, the water uptake value is less than 25% the water uptake value of the corresponding block copolymer.

Furthermore, in some embodiments, the water uptake value of the modified block copolymer is from 0% to 90% relative to the dry polymer. In other embodiments, the water uptake value of the modified block copolymer is from 0% to 75% relative to the dry polymer. In additional embodiments, the water uptake value of the modified block copolymer is from 0% to 50% relative to the dry polymer. In further embodiments, the water uptake value of the modified block copolymer is from 0% to 25% relative to the dry polymer. In still further embodiments, the water uptake value of the modified block copolymer is from 0% to 20% relative to the dry polymer. It will be understood by those skilled in the art that suitable ranges include any combination of the specified percentages even if the specific combination and range is not listed herewith.

In addition to being dimensionally stable, it has been found that the modified block copolymers, exhibit exceptional transport characteristics. In some embodiments, the modified block copolymers exhibit a high conductivity while, at the same time, having a high selectivity to transport anions.

The area resistance of a membrane can be determined by direct current (DC) measurements or by alternating current (AC) measurements. Resistance measured by DC is typically higher than resistance measured by AC, because resistance measured by DC includes boundary layer effect. Since the boundary layer effect always exists in the real application, resistance data from a DC method more closely represent the performance of the material in a practical application. For measuring membrane resistance, the potential drop between Haber-Luggin capillaries (in the art also referred to as Luggin or Luggin-Haber capillaries) is measured with and without the membrane as a function of the current density in an apparatus schematically shown in FIG. 1. The resistance is given by the slope of the current vs. the voltage drop. To obtain the membrane resistance, the resistance without the membrane is subtracted from the resistance with the membrane. FIG. 2 illustrates how to obtain membrane resistance. Membrane resistance is the difference in slope.

In some embodiments, the membranes of the modified block copolymers having a thickness of about 20-45 µm exhibit an area resistance of no more than 5 Ωcm2. In further embodiments, the area resistance of the respective membranes is no more than 2.5 Ωcm2. In particular embodiments, the area resistance of the respective membranes is 1.0 Ωcm2 or less. In very particular embodiments, the area resistance of the respective membranes is at most 0.85 Ωcm2 or is at most 0.75 Ωcm2.

In some embodiments, the membranes of the modified block copolymers exhibit a conductivity of at least 0.5 mS/cm. In further embodiments, the conductivity of the membranes is at least 1 mS/cm, or is at least 1.5 mS/cm. In particular embodiments, the conductivity of the membranes is 2.0 mS/cm or higher, or is at least 3.0 mS/cm. In very particular embodiments, the conductivity of the membranes is at least 4.5 mS/cm.

Figure 3:
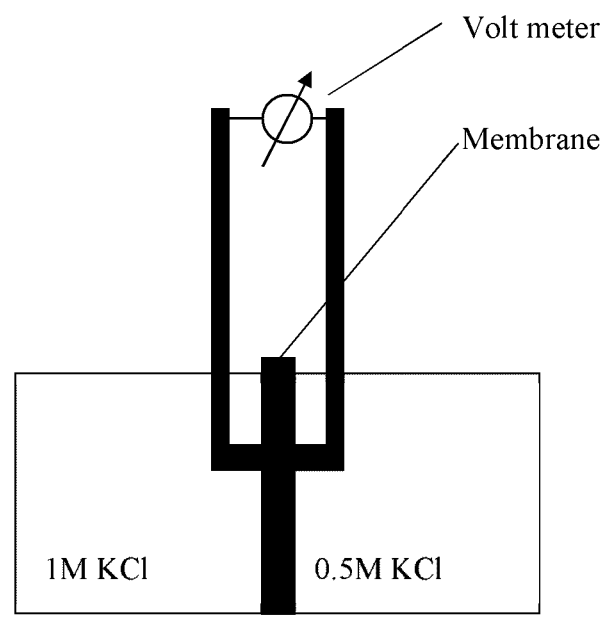
FIG. 3 schematically illustrates the experiment set-up for measuring the permselectivity.

In some embodiments, it has surprisingly been found that the membranes of the modified block copolymers are permselective. The permselectivity of the membranes can be determined as an "apparent" permselectivity based on the measurement of the potential gradient across a membrane which separates two electrolyte solutions having different electrolyte concentrations. Those of ordinary skill will appreciate that the apparent permselectivity is always larger than the permselectivity under practice conditions because the measurement fails to account for boundary layer effects. However, the difference between the measured permselectivity value and the permselectivity under practice conditions is generally small. FIG. 3 schematically illustrates the experiment set-up for measuring the permselectivity. In the illustrative set-up of FIG. 3, the electrolyte solution on one side of the membrane has a concentration of 0.5M KCl, and the electrolyte concentration is the solution on the other side of the membrane is 1M KCl. For a membrane with transport number of 1, the potential difference across the membrane should be 0.0158 volt. On this basis, the permselectivity of the actual membrane can be calculated according to following equation:

$$\text{Permselectivity}(\%) = \text{potential drop across membrane}/0.0158$$

Of course, other solutions and concentrations can be used too. But corrections need to be made for different concentrations as well as for difference in ion mobility in solutions.

In some embodiments, the permselectivity of the modified block copolymers is similar to or better than the permselectivity of a corresponding sulfonated block copolymer. Accordingly, in some embodiments, the permselectivity of the modified block copolymers is at least 90% of that of a corresponding sulfonated block copolymer. In other embodiments, the permselectivity of the modified block copolymers is at least 95% of that of a corresponding sulfonated block copolymer. In further embodiments, the permselectivity of the modified block copolymers is at least 98% of that of a corresponding sulfonated block copolymer. In particular embodiments, the permselectivity of the modified block copolymers is at least 100% of that of a corresponding sulfonated block copolymer. In very particular embodiments, the permselectivity of the modified block copolymers is at least 105% of that of a corresponding sulfonated block copolymer.

In some embodiments, the modified block copolymers have an anion exchange selectivity of at least 80%. On other embodiments, the anion exchange selectivity of the modified membranes is at least 85%. In further embodiments, the anion exchange selectivity of the modified block copolymers is at least 90%. In particular embodiments, the anion exchange selectivity of the modified block copolymers is at least 92%. In very particular embodiments, the anion exchange selectivity of the modified block copolymers is at least 95% or is at least 97%.

8. Applications of the Modified Block Copolymers

The modified sulfonated block copolymers may be compounded with other components not adversely affecting the copolymer properties. The modified block copolymers may be blended with a large variety of other polymers, including olefin polymers, styrene polymers, hydrophilic polymers and engineering thermoplastic resins, with polymer liquids and other fluids such as ionic liquids, natural oils, fragrances, and with fillers such as nanoclays, carbon, carbon black, carbon nanotubes, fullerenes, and traditional fillers such as talcs, silica and the like.

Additionally, the modified sulfonated block copolymers may be blended with conventional styrene/diene and hydrogenated styrene/diene block copolymers, such as the styrene block copolymers available from Kraton Polymers LLC.

Illustrative styrene block copolymers include linear S-B-S, S-I-S, S-EB-S, S-EP-S block copolymers. Also included are radial block copolymers based on styrene along with isoprene and/or butadiene and selectively hydrogenated radial block copolymers. Particularly useful are blends with the block copolymer precursor, the block copolymer prior to sulfonation.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha-olefin copolymers, and other alpha-olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25%-wt. copolymerized styrene monomer.

Hydrophilic polymers include polymeric bases which are characterized as having an available pair of electrons for interaction with acids. Examples of such bases include polymeric amines such as polyethyleneamine, polyvinylamine, polyallylamine, polyvinylpyridene, and the like; polymeric analogs of nitrogen containing materials such as polyacrylamide, polyacrylonitrile, nylons, ABS, polyurethanes and the like; polymeric analogs of oxygen containing compounds such as polymeric ethers, esters, and alcohols; and acid-base hydrogen bonding interactions when combined with glycols such as polyethylene glycol, and polypropylene glycol, and the like, polytetrahydrofuran, esters (including polyethylene terephthalate, polybutyleneterephthalate, aliphatic polyesters, and the like), and alcohols (including polyvinylalcohol), poly saccharides, and starches. Other hydrophilic polymers that may be utilized include sulfonated polystyrene.

Hydrophilic liquids such as ionic liquids may be combined with the polymers of the present invention to form swollen conductive films or gels. Ionic liquids such as those described in U.S. Pat. Nos. 5,827,602 and 6,531,241 (which disclosures are herein incorporated by reference) may be introduced into the modified sulfonated polymers either by swelling a previously cast membrane, or by adding to the solvent system before casting a membrane, coating a film or forming a fiber.

Illustrative materials that may be used as additional components include, without limitation: (1) pigments, antioxidants, stabilizers, surfactants, waxes, and flow promoters; (2) particulates, fillers and oils; and (3) solvents and other materials added to enhance processability and handling of the composition.

Pigments, antioxidants, stabilizers, surfactants, waxes and flow promoters, when utilized in combination with the modified sulfonated block copolymers may be included in amounts up to and including 10%-wt., i.e., from 0 to 10%, based on the total weight of the composition. When any one or more of these components are present, they may be present in an amount from about 0.001 to about 5%-wt., and more preferably from about 0.001 to about 1%-wt.

Particulates, fillers and oils may be present in an amount up to and including 50%-wt., from 0 to 50% based on the total weight of the composition. When any one or more of these components are present, they may be present in an amount from about 5 to about 50%-wt., preferably from about 7 to about 50%-wt.

It will be understood by those having ordinary skill in the art that the amount of solvents and other materials added to enhance processability and handling of the composition will in many cases depend upon the particular composition formulated as well as the solvent and/or other material added. Typically such amount will not exceed 50%, based on the total weight of the composition.

The modified sulfonated block copolymers described herein can be employed in a variety of applications and end uses, and their property profile renders them particularly suited as materials in applications which require high modulus when immersed in water, good wet strength, good dimensional stability, good water and ion transport characteristics, good methanol resistance, easy film or membrane formation, good barrier properties, controlled flexibility and elasticity, adjustable hardness, and thermal/oxidative stability.

In one embodiment of the present invention, the modified sulfonated block copolymers may be used in electrochemical applications, such as in fuel cells (separator phase), proton exchange membranes for fuel cells, dispersions of metal impregnated carbon particles in sulfonated polymer cement for use in electrode assemblies, including those for fuel cells, water electrolyzers (electrolyte), acid batteries (electrolyte separator), super capacitors (electrolyte), separation cell (electrolyte barrier) for metal recovery processes, sensors (particularly for sensing humidity) and the like. The modified sulfonated block copolymers are also used as desalination membranes, and in coatings on porous membranes. Their selectivity in transporting gases makes them useful for gas separation applications. Additionally, the modified sulfonated block copolymers are used in protective clothing and breathable fabric applications where the membranes, coated fabrics, and fabric laminates could provide a barrier of protection from various environmental elements (wind, rain, snow, chemical agents, biological agents) while offering a level of comfort as a result of their ability to rapidly transfer water from one side of the membrane or fabric to the other, e.g., allowing moisture from perspiration to escape from the surface of the skin of the wearer to the outside of the membrane or fabric and vice versa. Full enclosure suits made from such membranes and fabrics may protect first responders at the scene of an emergency where exposure to smoke, a chemical spill, or various chemical or biological agents are a possibility. Similar needs arise in medical applications, particularly surgery, where exposure to biological hazards is a risk. Surgical gloves and drapes fabricated from these types of membranes are other applications that could be useful in a medical environment. Articles fabricated from these types of membranes could have antibacterial and/or antiviral and/or antimicrobial properties as reported in U.S. Pat. Nos. 6,537,538, 6,239,182, 6,028,115, 6,932,619 and 5,925,621 where it is noted that polystyrene sulfonates act as inhibitory agents against HIV (human immunodeficiency virus) and HSV (herpes simplex virus). In personal hygiene applications, a membrane or fabric of the present invention that would transport water vapor from perspiration while providing a barrier to the escape of other bodily fluids and still retain its strength properties in the wet environment would be advantageous. The use of these types of materials in diapers and adult incontinence constructions would be improvements over existing technologies.

Accordingly, in some embodiments, the modified sulfonated block copolymers described herein are particularly employed as materials for water vapor transporting membranes which are employed in wet or aqueous environments. Such membranes are, for example useful in fuel cells, filtration devices, devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries.

Membranes comprising the modified block copolymers may exhibit anionic, cationic or bipolar characteristics.

In some embodiments, the modified block copolymers are particularly advantageously employed in a membrane for an electro-deionization assembly which comprises at least one anode, at least one cathode, and one or more membranes. Electro-deionization assemblies include, in particular, desalination cells. An illustrative representation of a desalination cell is set forth in FIG. 4.

To be useful in an electrically driven desalination application, a membrane which transports cations is needed to transport ions that are attracted to the negatively charged electrode. This membrane must reject anions (cationic membrane). Each cell also needs a membrane which transports anions in the direction of the positively charged electrode (anionic membrane). It is important that the anionic membrane does not transport cations; a high level of selectivity for anions is important for the efficient use of electricity in these devices. In addition to being well matched to the cationic membrane in electrical properties, the anionic membrane also must be similar to the cationic membrane in mechanical properties, as well.

In some embodiments, the membranes comprising the modified block copolymer are particularly suited as anionic membranes. In particular applications the anionic membranes comprising the modified block copolymer may advantageously be paired with at least one cationic membrane.

Particular cationic membranes which are suited to be paired with the anionic membranes comprising the modified block copolymer are cation-exchange membranes which comprises a sulfonated block copolymer comprising at least two polymer end blocks A and at least one polymer interior block B, wherein each A block contains essentially no sulfonic acid or sulfonated ester functional groups and each B block comprises sulfonation susceptible monomer units and, based on the number of the sulfonation susceptible monomer units, from about 10 to about 100 mol % of sulfonic acid or sulfonate ester functional groups. Such cation-exchange membranes preferably comprise a sulfonated block copolymer as used for the preparation of the modified block copolymer and as herein-above described.

In some embodiments, the membranes comprising the modified block copolymer are particularly suited as bipolar membranes, i.e., membranes which allow the transport of anions as well as cations without transporting electrons. Bipolar membranes are especially useful in electro-dialysis processes such as water splitting which efficiently converts aqueous salt solutions into acids and bases.

9. Examples

The following examples are intended to be illustrative only, and are not intended to be, nor should they be construed as, limiting the scope of the present invention in any way.

a. Materials and Methods

The tensile modulus in the dry state as described herein was measured according to ASTM D412.

The tensile modulus in the wet state as described herein was measured similar to the method according ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The WVTR as described herein was measured similar to ASTM E 96/E96M. The ASTM method was modified by using a smaller vial, employing 10 ml of water, and having an area of exposed membrane of 160 mm2 (as opposed to 1000 mm2 according to the ASTM method). After adding the water and sealing the vial with the membrane test specie, the vial was inverted, and air having a temperature of 25° C. and a relative humidity of 50% was blown across the membrane. Weight loss was measured versus time, and the water transport rate was calculated on the basis of the measurements as g/m2, or as g×mil/m2 when normalized for thickness of the tested membrane.

The degree of sulfonation as described herein and as determined by titration was measured by the following potentiometric titration procedure. The non-neutralized sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by 1H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-d8 (THF-d8), to which was then added with a partial drop of concentrated H2SO4 to shift interfering labile proton signals downfield away from aromatic proton signals in subsequent NMR analysis. The resulting solution was analyzed by 1H-NMR at about 60° C. The percentage styrene sulfonation was calculated from the integration of 1H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein was determined by the potentiometric titration method described above and was reported as milliequivalents of sulfonic acid functionality per gram of sulfonated block copolymer.

The formation of micelles was confirmed by particle size analysis on a Malvern Zetasizer Nano Series dynamic light scattering instrument, model number ZEN3600, available from Malvern Instruments Limited, UK, using polymer sample solutions diluted to a concentration of about 0.5 to 0.6%-wt. with cyclohexane. The diluted polymer solution samples were placed in a 1 cm acrylic cuvette and subjected to the instrument's general purpose algorithm for determination of size distribution as a function of intensity (see A. S. Yeung and C. W. Frank, Polymer, 31, pages 2089-2100 and 2101-2111 (1990)).

The area resistance can be determined by direct current (DC) measurements or by alternating current (AC) measurements. Resistance measured by DC is typically higher than resistance measured by AC, because resistance measured by DC includes boundary layer effects. Since boundary layer effects always exists in praxis, resistance data from DC method more closely represent the praxis performance.

Figure 2:
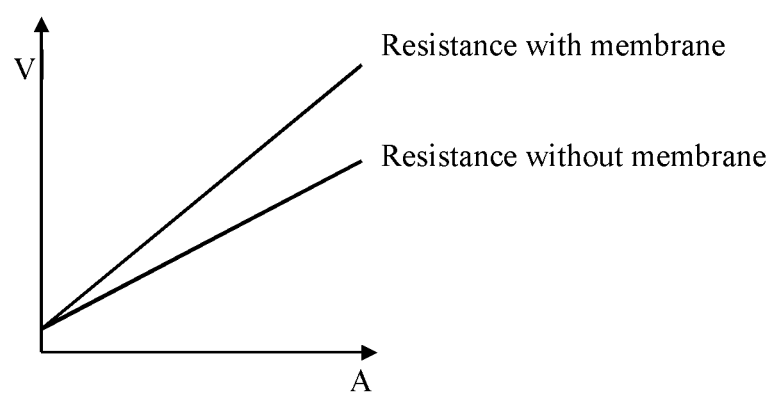
FIG. 2 illustrates how to obtain membrane resistance from measurements taken in a set-up according to FIG. 1.

The membrane resistance was measured by a direct current method using a set-up as illustrated in FIG. 1. The potential drop between the Haber-Luggin capillaries was measured with and without the membrane as a function of the current density. The resistance was determined from the slope of voltage vs. current. To obtain the membrane resistance, the resistance without the membrane was subtracted from the resistance with the membrane. FIG. 2 illustrates how to obtain membrane resistance. Membrane resistance is the difference in the slopes.

Membrane area resistance is dependent on thickness. Therefore, area resistance of membranes which differ in thickness cannot be compared. To obtain true membrane properties, membrane conductivity is often used. Membrane conductivity was calculated by dividing the membrane thickness by membrane area resistance.

"True" membrane permselectivity should be based on the measurement of ion concentration changes of both concentrate and dilute solutions by measuring the amount of current passing through the electrodialysis system. But this method is time consuming.

An alternative method is measuring "apparent" permselectivity, which is based on the measurement of the potential gradient across a membrane separating two electrolyte solutions of different concentrations. It is worthy to point out that the apparent permselectivity is always larger than the real permselectivity because it does not take boundary layer effects into account. However, the difference is generally small. The experiment set-up is schematically shown in FIG. 3.

The potential between two electrolyte solutions of different concentrations, i.e. membrane potential ($\varphi_m$) was measured using a voltmeter. Membrane potential ($\varphi_m$) can be expressed by the following equation:

$$\varphi_m = (2T_{cou} - 1)\frac{RT}{F}\text{Ln}\frac{a1}{a2}$$

where $T_{cou}$ is the membrane transport number of the counter-ions, a1 and a2 are the activity of the two KCl solutions, R is the gas constant, and T is the temperature, and F is the Faraday constant. For a strictly permselective membrane (where $T_{cou}$ is 1), membrane potential is following:

$$\varphi_{m,sp} = \frac{RT}{F}\text{Ln}\frac{a1}{a2}$$

The apparent permselectivity of a membrane ($\psi$), when measured in KCl solutions, is given by the following equation:

$$\psi = \frac{\varphi_m}{\varphi_{m,sp}}$$

In the example above, one side of the membrane is 0.1M KCl, the other side of the membrane is 0.5M KCl, and $\varphi_{m,sp}$ is 36.2 mV. Therefore, the apparent permselectivity of a membrane can be calculated according to following equation:

$$\psi = \frac{\text{Measured } \varphi_m \text{ in mV}}{36.2 \text{ mV}}$$

Of course, other solutions and concentrations can be used too. But corrections need to be made for different concentrations as well as for difference in ion mobility in solutions.

Figure 4:
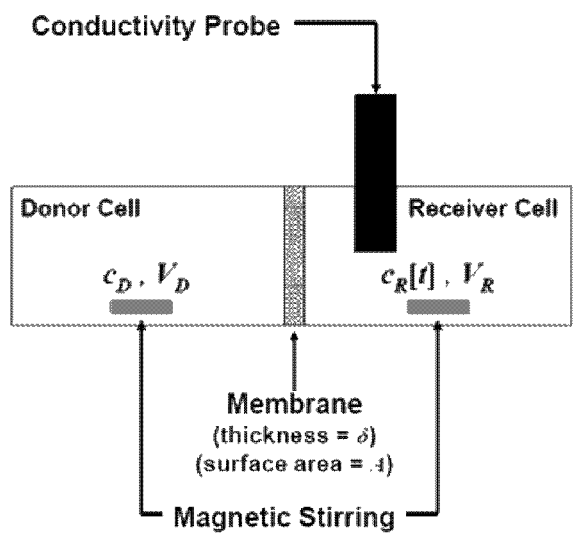
FIG. 4 schematically illustrates the experiment set-up for measuring the permeability.
Figure 5:
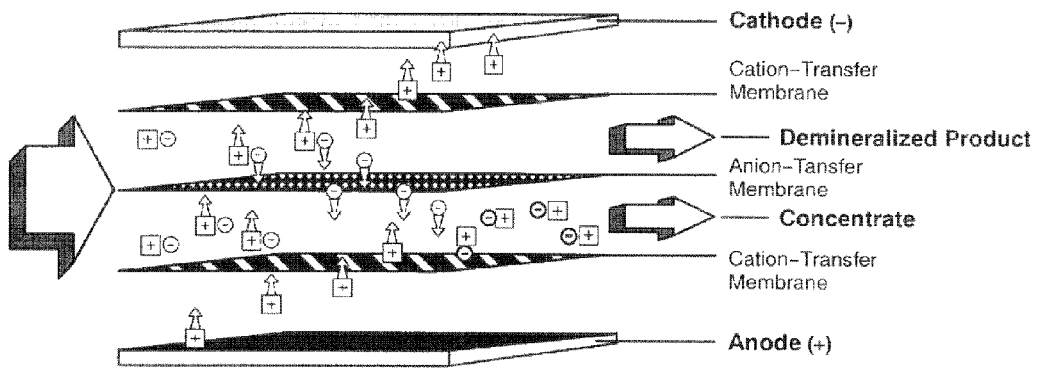
FIG. 5 schematically illustrates a desalination cell.

The experimental set-up for measuring salt permeability is shown in the FIG. 4. The membrane was sandwiched between two cells: donor cell and receiving cell. The donor cell contained a salt solution with known concentration, and the receiving cell contained pure water at the start of the experiment. As salt permeated through the membrane from the donor cell to the receiving cell, the salt concentration in the receiving cell increased, and it was monitored by a conductivity probe over the time.

Salt permeability can be deducted from following equation, where Ps is the salt permeability, t is the time, VR is the volume of the cells, δ is the membrane thickness, A is the membrane area, CD[0] is the starting salt concentration in the donor cell, and CR[t] is the salt concentration over the testing time in the receiving cell.

$$\ln\left[1 - \frac{2c_R[t]}{c_D[0]}\right]\left(\frac{-V_R\delta}{2A}\right) = P_s t$$

For some membranes, $P_s$ is dependent on the starting salt concentration ($C_D[0]$), therefore, $C_D[0]$ is often reported along with $P_s$. In our test, $C_D[0]$ was 2000 ppm NaCl.

b. Preparation Examples

Preparation of Sulfonated Block Copolymers:

A pentablock copolymer having the configuration A-D-B-D-A was prepared by sequential anionic polymerization where the A blocks are polymer blocks of para-tertbutylstyrene (ptBS), the D blocks were comprised of polymer blocks of hydrogenated isoprene (Ip), and the B blocks wererere comprised of polymer blocks of unsubstituted styrene (S). Anionic polymerization of the t-butylstyrene in cyclohexane was inititated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene having a molecular weight of 28,000 g/mol. To this solution was added another aliquot of isoprene monomer resulting in an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride). The resulting sulfonated block copolymer was found, by potentiometric titration, to have an "Ion Exchange Capacity (IEC)" of 2.0 meq of —SO$_3$H/g of polymer. The solution of sulfonated polymer had a solids level of about 10% wt/wt in a mixture of heptane, cyclohexane, and ethyl i-butyrate. The sulfonated block copolymer is hereinafter referred to as SBC-2.0.

Corresponding solutions of a sulfonated block copolymer having an IEC of 1.5 meq of —SO$_3$H/g of polymer (SBC-1.5) and of a sulfonated block copolymer having an IEC of 1.0 meq of —SO$_3$H/g of polymer (SBC-1.0) can be prepared in a similar manner.

Illustrative Preparation of Embodiments (I.2):

An anhydrous 250 mL three-neck round bottom flask was charged with an SBC-2.0 solution (165 g, 10 wt % polymer, 2.0 meq/g SO$_3$H, 16.5 g polymer, 33 meq SO$_3$H) under a purge of nitrogen. To this solution was added thionyl chloride (1.1 eq, 2.65 mL) in batches; the solution darkened to a green color and gas evolution was observed. After 45 minutes, N,N-dimethylethylenediamine (2.0 eq, 7.21 mL) was added to the solution in 1 mL increments; fuming in the flask was observed, along with slight warming of the flask (~35° C.). The solution was initially heterogeneous but became opaque and more viscous upon complete addition of the amine. The solution was left to react under nitrogen at room temperature for about 16 hours. To the reaction flask was then added alkyl bromide (ethyl, butyl, octyl, decyl, or dodecyl) (5.0 eq, 28.5 mL for bromooctane) all at once. The solution was allowed to react under nitrogen at room temperature for 24-48 hours.

Illustrative Preparation of Embodiments (I.3):

The reactions were carried out in a 5 liter jacketed glass vessel equipped with a four neck flask head. All reactions were carried out under a nitrogen sweep. The byproducts of the reaction were scrubbed using a caustic solution.

The synthesis was conducted in three steps, and each step was given 24 hours to go to completion. All steps were initiated at room temperature.

Step 1: 3.2 liters of an SBC-2.0 solution (cyclohexane/heptane mixture) (ion exchange capacity (IEC) of 2.0 meq of —SO3H/g of polymer; 0.52 mol sulfonic acid functionality) was added to the reaction vessel. Thionyl chloride (41.92 ml (0.57 moles, slight excess)) was added dropwise at room temperature to the SBC-2.0 solution. No exotherm was observed. Gas evolution was observed and the solution turned slightly green.

Step 2: Triethylamine (72.82 ml (0.52 moles)) was added to scavenge the residual acid chloride prior to sulfonamide formation. Addition was executed over 1 hour with an exotherm of ~9° C. Salt formation was observed.

Step 3: Sulfonamide formation was accomplished by adding butylamine (77.46 ml (0.78 moles, 50% excess)) to the sulfonyl chloride solution of Step 2. Addition was performed over 30 minutes, with an exotherm of ~9° C. Gas evolution was observed initially, and the solution turned tan in color.

Illustrative Preparation of Embodiments (I.4):

An anhydrous 250 mL two-neck round bottom flask was charged with SBC-2.0 polymer solution (85.8 g, 10 wt % polymer, 2.0 meq/g SO3H, 8.58 g polymer, 17.16 meq SO3H) under a purge of nitrogen. To this solution was added thionyl chloride (1.5 eq, 1.88 mL) in batches; the solution darkened to a green color and gas evolution was observed. After 45 minutes, 3,3'-iminobis(N,N-dimethylpropylamine) (2.5 eq, 9.56 mL) was added to the solution in 1 mL increments; fuming in the flask was observed, along with slight warming of the solution (~35° C.). The solution was initially heterogeneous but became opaque and more viscous upon complete addition of the amine. The solution was left to react under nitrogen at room temperature for about 16 hours. To the reaction flask was then added the alkyl bromide (butyl, octyl, decyl) (5.0 eq, 9.21 mL for bromobutane) all at once. The solution was allowed to react under nitrogen at room temperature for an additional 24-48 hours.

Illustrative Preparation of Embodiments (I.5):

An anhydrous 250 mL three-neck round bottom flask was charged with SBC-2.0 polymer solution (84.7 g, 10 wt % polymer, 2.0 meq/g SO$_3$H, 8.47 g polymer, 16.94 meq SO$_3$H) under a purge of nitrogen. To this solution was added thionyl chloride (1.5 eq, 1.85 mL) in batches; the solution darkened to a green color and gas evolution was observed. After 45 minutes, dimethyl ethylenediamine (2.0 eq, 3.7 mL) was added to the solution in 1 mL increments; fuming in the flask was observed, along with slight warming of the solution (~35° C.). The solution was initially heterogeneous but became opaque and more viscous upon complete addition of the amine. The solution was left to react under nitrogen at room temperature for 16 hours. To the reaction flask was then added propane sultone (2.5 eq, 3.7 mL) all at once. The solution was allowed to react under nitrogen at room temperature for an additional 24-48 hours.

An anhydrous 100 mL three-neck round bottom flask was charged with SBC-2.0 polymer solution (57.9 g, 10 wt % polymer, 2.0 meq/g SO3H, 5.79 g polymer, 11.58 meq SO3H) under a purge of nitrogen. To this solution was added thionyl chloride (1.1 eq, 0.93 mL) in batches; the solution darkened to a green color and gas evolution was observed. To a 50 mL round bottom flask was added 6-aminocaproic methylester (2.0 eq, 3.33 g); to this was added CHCl3 (5 mL) and a few drops of methanol to aid in the dissolution of the solid, which was then allowed to stir under N2 for 10 minutes. After the polymer solution had reacted with thionyl chloride for 45 minutes, the solution of 6-aminocaproic methylester was added slowly to the sulfonyl chloride solution. No fuming of the solution was observed; the polymer solution became cloudy and heterogeneous where the aminocaproic ester was added, and no noticeable warming of the reaction flask was observed. The solution was left to react under a purge of N2 for 24 hours.

Half of the polymer solution was removed; the remaining solution (~20 g solution) was cooled to 0° C. in an ice bath. A solution of 2M NaOH in methanol was prepared; assuming 2.0 g polymer and 4.0 meq COOH groups, the NaOH solution (5.5 eq, 0.88 g NaOH in 11 mL MeOH) was added at 0° C. under N2 to the protected polymer solution. The solution was allowed to stir at 0° C. for 60 minutes, then at room temperature for 16 hours.

The 6-aminocaproic acid methyl ester was obtained in the following manner: An anhydrous 250 mL round bottom flask was charged 100 mL methanol; the flask was cooled to 0° C. in an ice bath. To this was added thionyl chloride (2.5 eq, 18 mL) in batches; the solution was allowed to react under N2 at 0° C. for 20 minutes. To the solution was added 6-aminocaproic acid (1.0 eq, 9.48 g) as a solid under a purge of N2. The reaction flask was allowed to slowly warm to room temperature. After 4.5 hours, the reaction solution was homogeneous and a yellow color. The excess solvent was removed via rotary evaporator under reduced pressure. The crude yellow product was dissolved in a hexane:ethylacetate:methanol mix and placed in a freezer. After 24 hours, the product was removed from the freezer and the solid isolated via vacuum filtration and washed with cold hexanes: ethyl acetate to yield a white crystalline product (63% yield, with remaining product in mother liquor). The ester was characterized by $^1$H and $^{13}$C NMR in CDCl$_3$ and D$_2$O.

Larger Scale Preparations:

All reactions were carried out in a 5 liter jacketed glass vessel equipped with a four neck flask head. All reactions were carried out under a nitrogen sweep. The by-products of the reaction were scrubbed using a caustic solution.

The synthesis was conducted in three steps, and each step was given 24 hours to go to completion. All steps were initiated at room temperature.

Step 1. In a representative experiment, 2 liters of an SBC-2.0 polymer solution (cyclohexane/heptane mixture) (ion exchange capacity (IEC) of 2.0 meq of —SO$_3$H/g of polymer; 0.33 mol sulfonic acid functionality) was added to the reaction vessel. Thionyl chloride (25 ml (0.34 moles, slight excess)) was added dropwise at room temperature to the SBC-2.0 solution. No exotherm was observed. Gas evolution was observed and the solution turned slightly green.

Step 2. Sulfonamide formation was accomplished by slow dropwise addition of N,N-dimethylethylenediamine (51.12 ml (0.47 moles, 50% excess)) to the sulfonyl chloride solution formed in Step 1. An exotherm of 15° C. was observed. The temperature was controlled by rate of addition of the diamine (the exotherm observed for each reaction varied slightly). The addition of the diamine was done over an hour. On addition of the diamine, fuming was seen immediately in the reaction flask.

Step 3. Ammonium salt formation was achieved by addition of 1-bromobutane (100.51 ml (0.936 moles, 200% excess)). The alkyl bromide was added all at once. No change in temperature was observed on addition of the alkyl halide.

Using the same procedure as above a representative of embodiment (I.1) was prepared using imidazole instead of the N,N-dimethylethylenediamine. The imidazole was pre-dissolved in 100 g THF.

The modified sulfonated block copolymers obtained in the manner described above are compiled in the following Table 1 with reference to the embodiments (I.1) to (I.5) described in the foregoing and as set forth below:

| General Structure: | Embodiment |
|---|---|
| 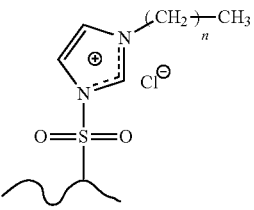 | (I.1) |
| 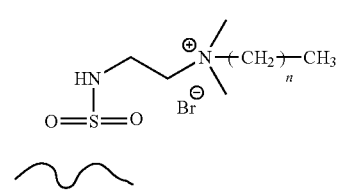 | (I.2) |

-continued

| General Structure: | Embodiment |
| --- | --- |
| (structure I.3: sulfonamide with HN-(CH₂)ₙ-CH₃ group on SO₂) | (I.3) |
| (structure I.4: bis-quaternary ammonium with Br⁻ counterions, central sulfonamide) | (I.4) |
| (structure I.5: bis-sulfonate bis-quaternary ammonium zwitterionic with central sulfonamide) | (I.5) |

TABLE 1

| Example No. | Embodiment | n | SBC |
| --- | --- | --- | --- |
| I.1-C4-2.0 | (I.1) | 3 | 2.0 |
| I.1-C4-1.0 | (I.1) | 3 | 2.0 |
| I.2-C4-1.0 (A) | (I.2) | 3 | 1.0 |
| I.2-C4-1.0 (B) | (I.2) | 3 | 1.0 |
| I.2-C4-2.0 (A) | (I.2) | 3 | 2.0 |
| I.2-C4-2.0 (B) | (I.2) | 3 | 2.0 |
| I.2-C4-2.0 (C) | (I.2) | 3 | 2.0 |
| I.2-C4-2.0 (D) | (I.2) | 3 | 2.0 |
| I.2-C4-2.0 (E) | (I.2) | 3 | 2.0 |
| I.2-C4-2.0 (F) | (I.2) | 3 | 2.0 |
| I.2-C8-2.0 (A) | (I.2) | 7 | 2.0 |
| I.2-C8-2.0 (B) | (I.2) | 7 | 2.0 |
| I.2-C8-2.0 (C) | (I.2) | 7 | 2.0 |
| I.2-C8-2.0 (D) | (I.2) | 7 | 2.0 |
| I.2-C8-2.0 (E) | (I.2) | 7 | 2.0 |
| I.3-C4-2.0 | (I.3) | 3 | 2.0 |
| I.3-C4-1.0 | (I.3) | 3 | 1.0 |
| I.3-C8-2.0 | (I.3) | 7 | 2.0 |
| I.3-Im-2.0 | (I.3) | $NR^3R^4$ = 1-imidazolyl | 2.0 |
| I.3-C8-1.0 | (I.3) | 1 | 1.0 |
| I.4-C4-1.0 | (I.4) | 3 | 1.0 | c. Results and Discussion

Tensile tests on membranes cast from various modified sulfonated block copolymers set forth in Table 1 afforded the mechanical property data set forth in the following Table 2:

TABLE 2

| Example No. | State | Young's Modulus (psi) | Tensile @ Yield (psi) | Elongation @ Yield (%) | Tensile @ Break (psi) | Elongation @ Break (%) |
| --- | --- | --- | --- | --- | --- | --- |
| I.2-C4-2.0 (A) | dry | 32,000 | 1,300 | 6 | 2,200 | 300 |
|  | wet | 24,000 | 880 | 6 | 1,900 | 380 |
| I.2-C4-2.0 (B) | dry | 24,000 | 750 | 5 | 1,200 | 270 |
|  | wet | 20,000 | 710 | 6 | 1,400 | 340 |
| I.2-C4-2.0 (C) | dry | 16,000 | 510 | 10 | 600 | 170 |
|  | wet | 12,000 | 390 | 11 | 680 | 230 |
| I.2-C4-1.0 (A) | dry | 53,000 | 1,600 | 4 | 1,500 | 170 |
|  | wet | 32,000 | 1,200 | 6 | 1,300 | 160 |
| I.2-C8-2.0 (A) | dry | 19,000 | 720 | 7 | 1,500 | 330 |
|  | wet | 16,000 | 590 | 6 | 700 | 160 |
| I.2-C8-2.0 (B) | dry | 26,000 | 980 | 6 | 2,100 | 350 |
|  | wet | 16,000 | 730 | 7 | 1,300 | 330 |
| I.2-C8-2.0 (C1)[a] | dry | 10,000 | 540 | 6 | 750 | 240 |
|  | wet | 4,600 | no yield | no yield | 550 | 100 |
| I.2-C8-2.0 (C2)[b] | dry | 17,000 | 920 | 8 | 1,600 | 290 |
|  | wet | 8,000 | no yield | no yield | 1,500 | 370 |
| I.1-C4-2.0 | dry | 75,000 | 2,400 | 5 | 2,800 | 220 |
|  | wet | 4,100 | no yield | no yield | 1,500 | 390 |
| I.1-C4-1.0 | dry | 140,000 | 3,800 | 4 | 3,100 | 120 |
|  | wet | 50,000 | 1,600 | 6 | 2,400 | 260 |
| I.4-C4-1.0 | dry | 72,000 | 2,000 | 5 | 2,200 | 230 |
|  | wet | 40,000 | 1,100 | 5 | 1,600 | 210 |
| I.3-C4-2.0 | dry | 81,000 | 2,200 | 4 | 2,100 | 170 |
|  | wet | 1,700 | no yield | no yield | 1,100 | 390 |
| I.3-C4-1.0 | dry | 79,000 | 2,500 | 5 | 2,400 | 170 |
|  | wet | 42,000 | 1,400 | 6 | 1,500 | 170 |
| I.3-C8-2.0 | dry | 34,000 | 850 | 5 | 1,200 | 250 |
|  | wet | 8,800 | 390 | 7 | 950 | 320 |

TABLE 2-continued

| Example No. | State | Young's Modulus (psi) | Tensile @ Yield (psi) | Elongation @ Yield (%) | Tensile @ Break (psi) | Elongation @ Break (%) |
|---|---|---|---|---|---|---|
| I.3-Im-2.0 | dry | 87,000 | 2,300 | 4 | 3,100 | 190 |
|  | wet | 4,600 | no yield | no yield | 1,200 | 340 |
| I.3-C8-1.0 | dry | 103,000 | 3,100 | 4 | 3,000 | 200 |
|  | wet | 35,000 | 1,400 | 7 | 2,500 | 280 |

[a] Cast from 5% solution of the modified block copolymer I.2-C8-2.0 (C)
[b] Cast from 10% solution of the modified block copolymer I.2-C8-2.0 (C)

Various transport properties were measured on membranes set forth in Table 1. The results of these experiments are summarized in the following Table 3:

TABLE 3

| Example No. | WVTR (g/m$^2$/day) | Swelling[1]* (area %) | H$_2$O uptake[1]* (wt. %) | Conductivity[2] (mS/cm) | Area Resistance[2] (Ωcm$^2$) | Permselectivity[3] (%) | NaCl Permeability (cm$^2$/sec) |
|---|---|---|---|---|---|---|---|
| I.2-C4-2.0 (A) | 22,000 | −1 | −9 | 5.3 | 0.82 (43 μm) |  | na |
|  |  |  |  | 5.7 | 0.65 (37 μm) | 96.1 |  |
| I.2-C4-2.0 (B) | 18,000 | 0 | −8 | 3.8 | 0.87 (33 μm) | 92.3 | 4.3 × 10$^{-9}$ |
| I.2-C4-2.0 (C) | 19,000 | 3 | 14 | 0.004 | 553 (21 μm) | 96.3 | 3.7 × 10$^{-8}$ |
| I.2-C4-1.0 (A) | 700 | na | na | 0.003 | 875 (22 μm) | 90.9 | 2.0 × 10$^{-10}$ |
| I.2-C8-2.0 (A) | 22,000 | 2 | −7 | 11 | 0.3 (33 μm) |  | 4.3 × 10$^{-8}$ |
|  |  |  |  | 0.734 | 4.74 (35 μm) | 95.0 |  |
|  |  |  |  | 12 | 0.29 (35 μm) | 85.0 |  |
| I.2-C8-2.0 (B) | 400 | na | na | na | na | na | na |
| I.2-C8-2.0 (C1)[a] | 1,900 | na | na | na | na | na | na |
| I.3-C8-2.0 (C2)[b] | 1,500 | 3 | 1 | na | na | na | 6.3 × 10$^{-7}$ |
| I.1-C4-2.0 | 22,000 | 34 | 64 | na | na | na | na |
| I.1-C4-1.0 | 500 | 9 | 17 | na | na | na | 5.4 × 10$^{-10}$ |
| I.1-C4-1.0 | 1,400 | 3 | 0 | na | na | na | 1.9 × 10$^{-9}$ |
| I.3-C4-2.0 | 16,000 | 55 | 50 | na | na | na | na |
| I.3-C4-1.0 | 100 | 5 | 5 | na | na | na | na |
| I.3-C8-2.0 | 3,800 | −8 | −19 | na | na | na | 4.6 × 10$^{-7}$ |
| I.3-C8-1.0 | 600 | 15 | na | na | na | na | na |
| I.3-Im-2.0 | 20,000 | 43 | 47 | na | na | na | na |

[a] Cast from 5% solution of the modified block copolymer I.2-C8-2.0 (C)
[b] Cast from 10% solution of the modified block copolymer I.2-C8-2.0 (C)
na = not analyzed
[1] Br-form, in water at 25° C., reference membrane dried at room temperature and 50% relative humidity
[2] Cl-form at 25° C. in 0.5M NaCl, 2-electrode set-up
[3] Determined from membrane potential measurement in a concentration cell 0.1/0.5M KCl at 25° C.
*As the modified block copolymers are not water soluble it is currently believed that the negative values which were observed in some instances may be due to the presence of water soluble by-products in the modified block copolymer, and leaching of such by-products from the membranes upon exposure to water.

A preferred anionic exchange membrane would have a high level of conductivity (>1 mS/cm), be very selective (>90%), and have a low level of swelling when immersed in water (<2%). The two membranes cast from I.2-C4-2.0 performed exceptionally well in this test. These membranes were cast from different synthesis batches which had been prepared using the same synthetic procedure. These membranes had excellent conductivity (3.8 and 5.7 mS/cm respectively), were highly selective (92.3 and 96.1%), and were dimensionally stable in water (both showed 0% swelling).

The two I.2-C8 2.0 (E) membranes were less efficient than the C4 counterparts. While the two samples were cast from the same batch of polymer solution, their performance characteristics differed. The I.2-C8-2.0 (C1) membrane had a high level of conductivity (12 mS/cm) with a reduced level of selectivity (85%). The I.2-C8-2.0 (C2) membrane on the other hand was selective in ion transport performance (95%) but had a lower level of conductivity (0.734 mS/cm). Both membranes resisted swelling. The difference in performance for these membranes which were cast for the same polymer solution is unexplained at this time.

As noted in Table 3, membranes I.2-C4-1.0 (B) and I.2-C4-2.0 (D) did not conduct ions effectively (0.003 and 0.004 mS/cm respectively). The I.2-C4-1.0 (B) membrane was cast from a modified SBC-1.0 (Ion Exchange Capacity (IEC) of 1 meq of functionality per g of polymer). While not wishing to be bound by a particular theory, it is currently believed that the reduced conductivity of this membrane was likely due to the low level of functionality of the starting polymer. The low level of functionality may have contributed to low continuity in the ion microphase which in turn caused a low level of ion transport in these tests. While the I.2-C4-2.0 (D) membrane was prepared from a modified SBC-2.0 (which has a higher level of functionality (IEC=2)), the solution of the modified block copolymer which was used for membrane casting contained excessive quantities of a precipitate, likely triethylammonium chloride. While not wishing to be bound by a particular theory, it is currently believed that this precipitate may have interfered with the formation of continuous ion channels in the cast membrane.

A confusing feature of the analysis of the modified block copolymers membranes centered around a titration protocol aimed at assessing the type of ion transport sites in the membranes and quantifying the concentration of these sites in the ion pathways within the membranes. To determine anion exchange capacity by titration, the membrane was first treated with 0.5 M NaCl solution, and then with 1M Na2SO4 solution, and titration of Cl− ions with AgNO3. Cation exchange capacity was determined by titration by first treating the membrane with 0.5 M H2SO4, then with 0.5 M NaCl solution, and titration of H+ ions with NaOH. This analytical procedure found sites for transporting cations in the membranes according to embodiment (I.2) rather than sites for transporting anions. This was an unexpected result.

Work is ongoing to verify this observation and to develop an understanding of the meaning of this observation.

The mechanical performance of the membranes as represented by embodiment (I.2) was assessed, as well. The results of these tests are summarized in the following Tables 4, 5, and 6. All of the investigated I.2-C4-2.0 membranes were exceptionally stable in water (see "Water Uptake" values in Table 4). They all transported water effectively, as well (see WVTR).

TABLE 4

MECHANICAL PERFORMANCE OF I.2-C4-2.0 (G3C4 9200) MEMBRANES.

| | I.2-C4-2.0 (C) | I.2-C4-2.0 (B) | I.2-C4-2.0 (A) |
|---|---|---|---|
| Water Uptake*: | | | |
| wt. % | −14 | −8 | −9 |
| area % | 3 | 0 | −1 |
| WVTR (l/m$^2$/day): | | | |
| Upright Cup | na | na | na |
| Inverted Cup | 19 | 18 | 22 |
| Tensile (wet/dry): | | | |
| Strength (psi) | 690/600 | 1,400/na | 1,900/2,200 |
| Elongation (%) | 230/170 | 340/na | 380/300 |
| Young's Modulus (psi) | 12,000/16,000 | 20,000/na | 24,000/32,000 |
| NaCl Permeability (cm$^2$/sec) | 3.7 × 10$^{-8}$ | 4.3 × 10$^{-9}$ | 3.2 × 10$^{-8}$ |

*see annotation in Table 3

The mechanical properties for I.2-C8-2.0 membranes are summarized in Table 5. As noted above for the I.2-C4-2.0 membranes, these membranes had excellent dimensional stability when placed in water. The membranes labeled I.2-C8-2.0 (C1) and I.2-C8-2.0 (C2) were, as noted above for I.2-C4-2.0 (C), cast from solutions that contained excessive amounts of a solid contaminant. As a consequence, these membranes performed poorly in the mechanical tests. Sample I.2-C8-2.0 (A) did not suffer from this contamination problem. Membrane I.2-C8-2.0 (A) had low water uptake, transported water effectively, had good mechanical properties both wet and dry (strong, flexible, moderately soft) and a low value for sodium chloride permeability. This membrane also had a lower level of ion conductivity (see Table 3). This particular property profile renders the membranes of this type useful, for example, for electrically driven separation processes.

TABLE 5

MECHANICAL PERFORMANCE OF I.2-C8-2.0 MEMBRANES.

| | I.2-C8-2.0 (C)$^{(a)}$ | I.2-C8-2.0 (C)$^{(b)}$ | I.2-C8-2.0 (B) | I.2-C8-2.0 (A) |
|---|---|---|---|---|
| Water Uptake*: | | | | |
| wt. % | 1 | 0 | na | −7 |
| area % | 3 | na | na | 2 |
| WVTR (l/m$^2$/day): | | | | |
| Upright Cup | na | na | na | na |
| Inverted Cup | 1.5 | 1.9 | na | 22 |
| Tensile (wet/dry): | | | | |
| Strength (psi) | 1,500/1,600 | 1,900/na | 1,300/na | 700/500 |
| Elongation (%) | 370/290 | 100/240 | 330/na | 160/330 |
| Young's Modulus (psi) | 8,500/17,000 | 4,600/10,000 | 16,000/na | 16,000/19,000 |
| NaCl Permeability (cm$^2$/sec) | 6.3 × 10$^{-7}$ | na | na | 4.3 × 10$^{-8}$ |

*see annotation in Table 3

An analog to the I.2-C4-2.0 membranes described in Table 4 was prepared using SBC-1.0. The electrical properties of the I.2-C4-1.0 membrane are listed in Table 6. This membrane had very good dimensional stability on exposure to water. However, this membrane had a relatively low capability to transport water and also showed relatively low sodium chloride permeability. The membrane was strong (both wet and dry), flexible, and relatively low in modulus.

TABLE 6

MECHANICAL PERFORMANCE OF I.2-C4-1.0 MEMBRANES

| | I.2-C4-1.0 (A) |
|---|---|
| Water Uptake: | |
| wt. % | 4 |
| area % | 4 |
| WVTR (l/m$^2$/day): | |
| Upright Cup | na |
| Inverted Cup | 0.7 |
| Tensile (wet/dry): | |
| Strength (psi) | 1,400/1,700 |
| Elongation (%) | 160/170 |
| Young's Modulus (psi) | 32,000/53,000 |
| NaCl Permeability (cm$^2$/sec) | 2.0 × 10$^{-10}$ |

As reflected by the data in Tables 2 and 4, the I.2-C4-2.0 (C) membrane was an "outlier" in terms of its mechanical performance and ability to transport sodium chloride, as well as, in its conductivity by comparison to the other I.2-C4-2.0 membranes. The I.2-C4-2.0 (C) membrane had low conductivity, low mechanical strength both wet and dry, and high sodium chloride permeability which suggest that the membrane may have been contaminated with triethylammonium chloride.

The I.2-C4-2.0 membranes cast without the solid impurity, e.g., I.2-C4-2.0 (A) and I.2-C4-2.0 (B), were found to be remarkably strong, flexible, and relatively soft materials and transported sodium chloride at a high rate. These were exceptionally good membranes for ion transport.

The I.2-C4-2.0 membranes were placed in a capacitive deionization cell adjacent to the positively charged electrode. When the cell was assembled, salty water was fed to the unit and electrical power was applied to the capacitor. Sodium chloride was efficiently removed from the feed stream. This result demonstrated that the I.2-C4-2.0 membranes selectively transported anions to the positively charged electrode. When power to the unit was turned off, the cell held over 1 volt of charge, this result demonstrated that the I.2-C4-2.0 membrane did not transport cations under these conditions.

In an attempt to deactivate the cell by flushing with additional salt water, it was surprisingly discovered that the unit continued to remove salt from the feed stream. From this result, it was deduced that the I.2-C4-2.0 membrane had bipolar performance characteristics.

Overall, the I.2-C4-2.0 membrane effectively transported ions, had good mechanical properties both wet and dry, and due to low water uptake, had exceptional dimensional stability on immersion in water.

The performance of membranes of embodiment (I.1) was investigated and the results are compiled in Table 7.

TABLE 7

|  | I.1-C4-2.0 | I.1-C4-1.0 |
|---|---|---|
| Water Uptake: | | |
| wt. % | 64 | 17 |
| area % | 34 | 9 |
| WVTR (l/m$^2$/day): | | |
| Upright Cup | na | na |
| Inverted Cup | 22 | 0.5 |
| Tensile (wet/dry): | | |
| Strength (psi) | 1,500/2,800 | 2,400/3,800 |
| Elongation (%) | 390/220 | 260/120 |
| Young's Modulus (psi) | 4,100/75,000 | 50,000/140,000 |
| NaCl Permeability (cm$^2$/sec) | na | 5.4 × 10$^{-10}$ |

As shown by the data, the membrane cast from the modified sulfonated block copolymer I.1-C4-2.0 had an interesting balance of performance characteristics. The membrane transported water effectively (22 l/m2/day), was strong, flexible and rather soft when wet. By comparison to the derivatives outlined in Tables 6 and 7, this membrane had a rather high level of water uptake, 64 wt %.

The related membrane prepared from I.1-C4-1.0 exceeded the I.1-C4-2.0 membrane in dimensional stability, as evidenced by the lower level of water absorption, while exhibiting a lesser degree of water vapor transport (WVTR=520 g/m2/day). The I.1-C4-1.0 membrane was very strong when wet and very stiff. While not wishing to be bound by theory it is presently believed that the membrane characteristics are due to low levels of connectivity in the ion microphase. The observation that sodium chloride permeability levels of the I.1-C4-1.0 membrane were lower (5.4×10−10 cm2/sec) than those of the I.1-C4-2.0 membrane is in line with this hypothesis.

The performance of a membrane of embodiment (I.3) was investigated and the results are compiled in Tables 8 and 9.

TABLE 8

|  | I.3-C4-2.0 | I.3-C4-1.0 |
|---|---|---|
| Water Uptake: | | |
| wt. % | 50 | 5 |
| area % | 55 | 5 |
| WVTR (l/m$^2$/day): | | |
| Upright Cup | na | na |
| Inverted Cup | 16 | 0.1 |

TABLE 8-continued

|  | I.3-C4-2.0 | I.3-C4-1.0 |
|---|---|---|
| Tensile (wet/dry): | | |
| Strength (psi) | 1,100/2,200 | 1,600/2,500 |
| Elongation (%) | 390/170 | 170/170 |
| Young's Modulus (psi) | 1,700/81,000 | 42,000/102,000 |
| NaCl Permeability (cm$^2$/sec) | na | na |

TABLE 9

|  | I.3-Im-2.0 | I.3-Im-1.0 | I.3-C8-2.0 |
|---|---|---|---|
| Water Uptake*: | | | |
| wt. % | 47 | 15 | −19 |
| area % | 43 | 7 | −8 |
| WVTR (l/m$^2$/day): | | | |
| Upright Cup | na | na | na |
| Inverted Cup | 20 | 0.6 | 3.8 |
| Tensile (wet/dry): | | | |
| Strength (psi) | 1,200/3,100 | na | 950/na |
| Elongation (%) | 340/190 | na | 320/na |
| Young's Modulus (psi) | 4,600/87,000 | na | 8,800/na |
| NaCl Permeability (cm$^2$/sec) | na | na | 4.6 × 10$^{-7}$ |

*see annotation in Table 3

The data in Tables 8 and 9 illustrate that the membranes of embodiment (I.3) were strong and tough both wet and dry at functionalities of 1.0 and 2.0 meq/g. The high level of interaction with water of the membranes cast from these modified block copolymers was unexpected. Although the modified block copolymers of the embodiment (I.3) do not contain polymer bound ions, the strength under wet conditions of the I.3-C4-2.0 membrane was considerably lower than that of the I.3-C4-1.0 membrane. The trend to interact with an aqueous environment was also evident in the I.3-C4-1.0 membrane, albeit to a lesser extent. The data indicate that the sulfonamide functionality of the modified block copolymers of embodiment (I.3) interacts strongly with water.

When compared to I.2-C4-2.0 membranes which carry ionic charges, the I.3-C4-2.0 membranes surprisingly have a higher affinity for water. Correspondingly, the mechanical properties on immersion in water of the I.3-C4-2.0 membranes are less favorable than those of the I.2-C4-2.0 membranes.

Surprisingly, the performance of the membranes according to embodiment I.3-C4-1.0 and I.3-C4-2.0 resembles that of membranes according to embodiment (I.3), both high and low functionality, matches up well with the performance of the I.1-C4-1.0 and I.1-C4-2.0 membranes. Both mechanical and transport properties for these two families of membranes are well aligned. This is surprising because the I.3-C4-1.0 and I.3-C4-2.0 membranes comprise an uncharged sulfonamide functional group whereas the functional group of the I.1-C4-1.0 and I.1-C4-2.0 membranes includes quaternary ammonium ions bound to the polymer backbone.

The mechanical and transport properties of I.3-Im membranes set forth in Table 10 were similar to those of the I.3-C4 membranes. In contrast thereto, the I.3-C8-2.0 membrane was hydrophobic. In spite of the limited water transport capability, the I.3-C8-2.0 membrane surprisingly exhibited high sodium chloride permeability.

The performance of a membrane of embodiment (I.4) was investigated and the results are compiled in Table 10.

TABLE 10

|  | I.4-C4-1.0 |
| --- | --- |
| Water Uptake: | |
| wt. % | 0 |
| area % | 3 |
| WVTR (l/m²/day): | |
| Upright Cup | na |
| Inverted Cup | 1.4 |
| Tensile (wet/dry): | |
| Strength (psi) | 1,600/na |
| Elongation (%) | 210/na |
| Young's Modulus (psi) | 40,000/na |
| NaCl Permeability (cm²/sec) | $1.9 \times 10^{-9}$ |

The modified sulfonated block copolymer I.4-C4-1.0 has twice as many functional sites per molecule as did the starting sulfonated polymer. The data in Table 11 show that the I.4-C4-1.0 membrane had good mechanical properties when immersed in water—strong (1,600 psi tensile at break), flexible (210% elongation at break), and relatively stiff (Young's Modulus 40,000 psi). The membrane demonstrated good dimensional stability on immersion in water, as well. The transport performance of this membrane was modest (WVTR (inverted cup) 1,400 g/m²/day for a 1 mil film; Sodium chloride permeability $1.9 \times 10^{-9}$ cm²/sec).

Comparison of Cationic and Anionic (Putative) Membrane Performance

Table 11 summarizes performance characteristics of a cationic membrane (A-1) cast from an N,N-dimethylacetamine solution of a sulfonated block copolymer having an ion exchange capacity of 1.0 meq/g as disclosed as Exp. Nos. 22 and 23 in co-pending application Ser. No. 61/394,112 (Filing Date: Oct. 18, 2010).

TABLE 11

|  | Dry | Wet[1] |
| --- | --- | --- |
| Young's Modulus (psi) | 70,000 | 32,000 |
| Tensile @ Yield (psi) | 2,100 | 900 |
| Elongation @ Yield (%) | 5 | 6 |
| Tensile @ Break (psi) | 1,700 | 1,100 |
| Elongation @ Break (%) | 100 | 80 |

[1]For wet testing, the sample was completely immersed in water for 24 hours prior to testing The membrane (A-1) was strong when tested wet as well as dry, was flexible, and had good transport performance. Additionally, as disclosed in Exp. Nos. 17 and 24 of co-pending application Ser. No. 61/394,112, the membrane (A-1) exhibited high flux and good selectivity for both ions and water. Therefore, the membrane is useful, for example, as a cationic membrane in an electro-deionization assembly.

Membranes of the modified sulfonated block copolymers in accordance with this disclosure which, due to their performance characteristics, are particularly suited to be applied in combination with the cationic membrane (A-1) are set forth in Table 12.

TABLE 12

|  | I.2-C4-2.0 (A) | | I.2-C8-2.0 (A) | | I.2-C4-2.0 | |
| --- | --- | --- | --- | --- | --- | --- |
|  | dry | wet | dry | wet | dry | wet |
| Young's Modulus (psi) | 32,000 | 24,000 | 19,000 | 16,000 | 75,000 | 4,100 |

TABLE 12-continued

|  | I.2-C4-2.0 (A) | | I.2-C8-2.0 (A) | | I.2-C4-2.0 | |
| --- | --- | --- | --- | --- | --- | --- |
|  | dry | wet | dry | wet | dry | wet |
| Tensile @ Yield (psi) | 1,000 | 880 | 720 | 590 | 2,400 | no yield |
| Elongation @ Yield (%) | 6 | 6 | 7 | 6 | 5 | no yield |
| Tensile @ Break (psi) | 2,200 | 1,860 | 1,500 | 700 | 2,800 | 1,500 |
| Elongation @ Break (%) | 300 | 380 | 330 | 160 | 220 | 390 |

From a mechanical strength perspective, each of the membranes mentioned in Table 12 matches up well with the cationic membrane (A-1). The I.2-C4-2.0 (A) and I.2-C8-2.0 (A) membranes are not quite as stiff as the cationic membrane (A-1) when dry; in all other aspects of mechanical properties, these membranes pair well. The I.1-C4-2.0 membrane is substantially softer when wet than the cationic membrane (A-1). Nonetheless, the I.1-C4-2.0 membrane should be suited for paring with the membrane (A-1) in an electro-desalination assembly.

Moreover, the data indicate that the modified sulfonated block copolymers of the present disclosure may be tailored with regard to their mechanical and transport properties to match the performance characteristics of cationic membranes in general, and in particular cationic membranes of the type disclosed in co-pending application Ser. No. 61/394,112.

Comparison of Transport Properties

Figure 6:
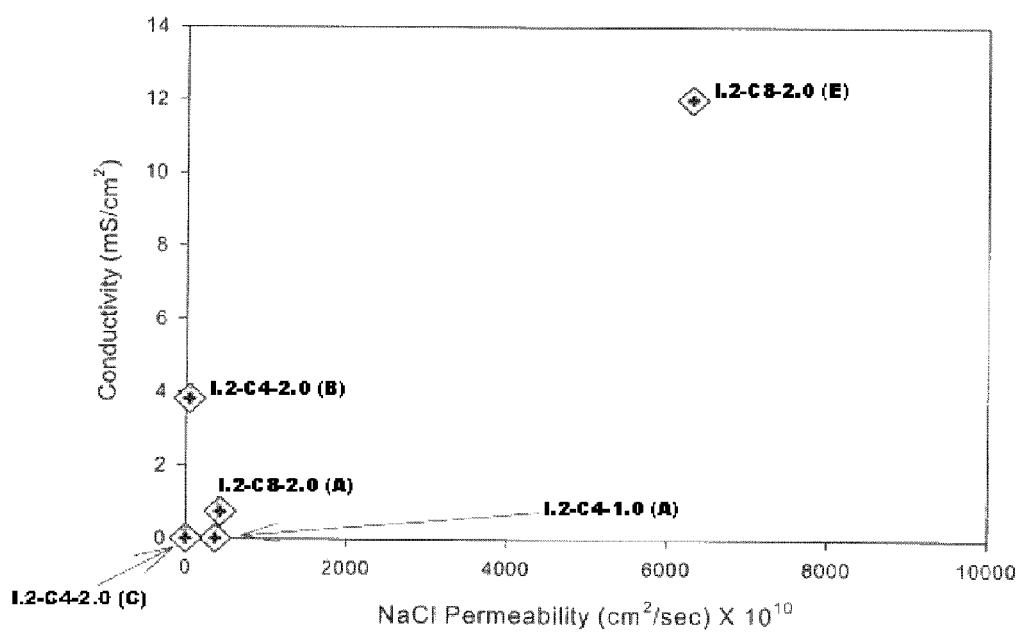
FIG. 6 shows the relationship of conductivity and sodium permeability of selected membranes according to the disclosure.

Based upon the current data it appears as though the membranes comprising the modified block copolymer which exhibit high levels of sodium chloride permeability also have high levels of ion transport in an applied electrical field (see FIG. 6). While each of these tests measures the transport through the membrane, this is a surprising result because the sodium chloride permeability is tested in the absence of an applied electrical field.

Figure 7:
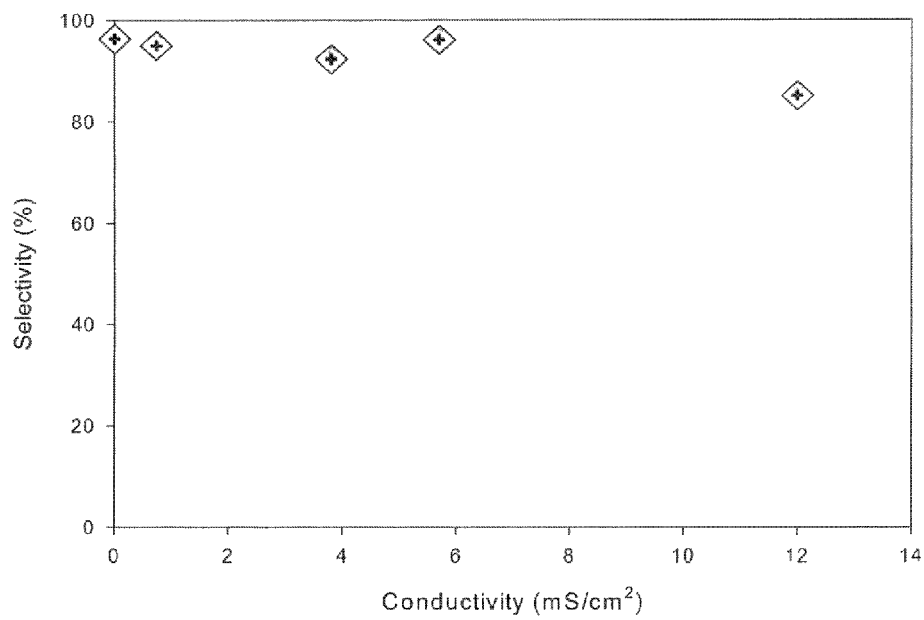
FIG. 7 shows the relationship of conductivity and ion selectivity of selected membranes according to the disclosure.

An examination of the effect of conductivity levels on membrane selectivity in an applied field did not show a strong correlation between these two performance measurements (see FIG. 7). In general, higher selectivity levels were observed at lower conductivity levels but the change in selectivity for the various membranes which have been tested was small (high of 96 and a low of 85%). Test to test variability in selectivity for the same membrane, I.2-C8-2.0 (A), covered essentially this whole range of values.

Figure 8:
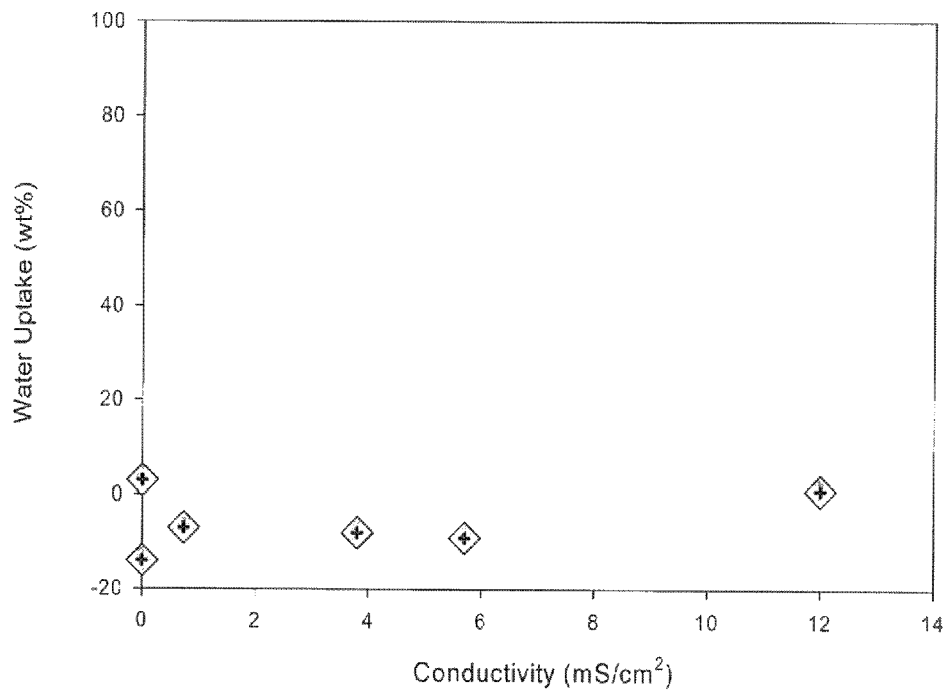
FIG. 8 shows the relationship of conductivity and water uptake of selected membranes according to the disclosure.

Water uptake for all of these membranes was low compared to the corresponding membranes comprising the sulfonated block copolymer and cast from cyclohexane. Many of the membranes according to the present disclosure actually afforded negative water uptake values when tested. While not wishing to be bound by theory, it is currently believed that this effect may reflect the level of water soluble impurities which were present in the membranes according to the present disclosure after casting and before equilibration in water in the water uptake measurement. As the test is conducted (membrane is weighed "dry"; it is soaked in water for 24 hours; it is then weighed "wet"), impurities in the cast membrane which leach out into the water during the soaking cycle may be responsible for a "false negative" result in the observed water uptake value. Based on the data, it is estimated that this "false negative" value may be of the order of 20 wt %. Even with this possible error in mind, the membranes in accordance with the present disclosure have very low water uptake; the membranes retain their dimensional values, as well, on exposure to water. This is an additional indication that they resist swelling in the presence of water. Surprisingly, the ion conductivity of the membranes in accordance with the present disclosure in the presence of an applied field does not correlate to water uptake of the membrane (see FIG. 8).

Figure 9:
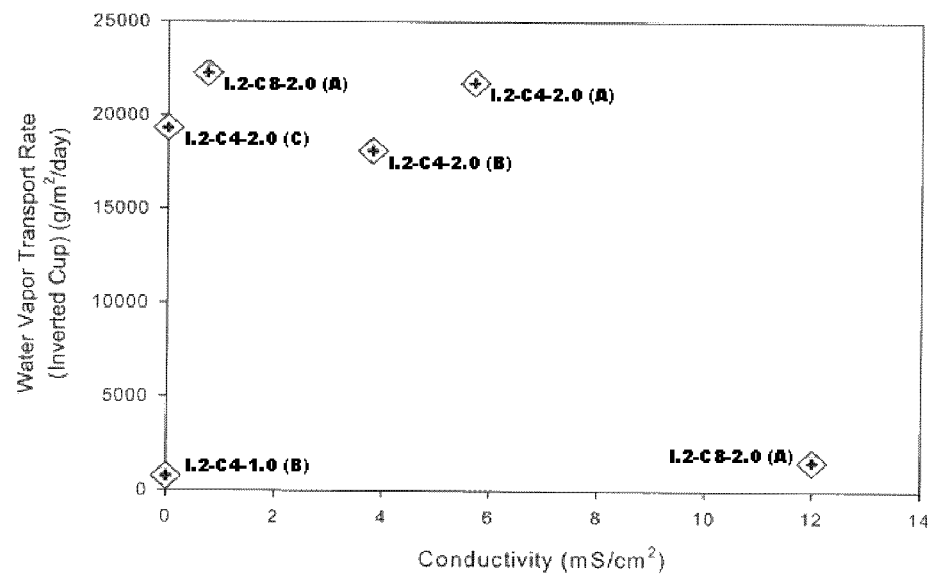
FIG. 9 shows the relationship of conductivity and water vapor transmission of selected membranes according to the disclosure.

Similarly, there was no clear correlation between water vapor transport rates as measured by the inverted cup test and ion conductivity in these membranes (see FIG. 9). In particular, for the I.2-C8-2.0 (E) membrane, ion transport through the ionic microphase was high even though there was very little water in this phase. This, too, is a surprising result. It would have been reasonable to expect that liquid water in the ion microphase would have been needed for ion transport.

Notably, selected membranes according to the present disclosure had very high water transport performance in the inverted cup test while demonstrating very low levels of no ionic sites is an unexpected result, as well. Again, this transport performance result is consistent with a phase separated membrane wherein the transporting phase (phase comprising the functional groups) is well organized and highly continuous.

Comparison with Sulfonated Block Copolymers

Selected membranes in accordance with the present disclosure have excellent ion transport characteristics, excellent mechanical performance, and remarkable dimensional stability on immersion in water. When measured by these performance criteria, the membranes prepared from selected modified block copolymers substantially outperformed membranes which are cast from the starting sulfonated block copolymer (see Tables 13 and 14). Membranes I.2-C4-2.0 (A) and I.2-C8-2.0 (A) outperformed membranes cast using an apolar solution of SBC-2.0.

TABLE 14[1]

|  | SBC-2.0 | SBC-1.0 | I.2-C4-2.0 (B) | I.2-C4-2.0 (A) | I.2-C8-2.0 (A) |
| --- | --- | --- | --- | --- | --- |
| Functionality Type: | Sulfonic Acid | Sulfonic Acid | Ammonium Salt | Ammonium Salt | Ammonium Salt |
|  | | Property (units): | | | |
| Water Uptake* (wt. %) | 85 | 10 | −8 | 14 | −7 |
| Conductivity (mS/cm) | 15 | no conductivity | 3.8 | 5.7 | 12 |
| Permselectivity (%) | 89 | no conductivity | 92 | 96 | 85 |
|  | | Tensile Strength (psi): | | | |
| Wet | 500 | 1,600 | 1,400 | 680 | 700 |
| Dry | 1,100 | 1,900 | 1,200 | 600 | 1,500 |

TABLE 15[1]

|  | SBC-2.0 | SBC-2.0 Na | I.2-C4-2.0 (B) | I.2-C4-2.0 (A) | I.2-C8-2.0 (A) |
| --- | --- | --- | --- | --- | --- |
| Functionality Type | Sulfonic Acid | Sodium Sulfonate | Ammonium Salt | Ammonium Salt | Ammonium Salt |
|  | | Property (units): | | | |
| Water Uptake* (wt. %) | 80 | na | −8 | 14 | −7 |
| WVTR (l/m$^2$/day) | 25 | 25 | 18 | 19 | 22 |
| NaCl Permeability (cm$^2$/sec) | $2.2 \times 10^{-7}$ | $7.9 \times 10^{-8}$ | $4.3 \times 10^{-9}$ | $3.7 \times 10^{-8}$ | $4.3 \times 10^{-8}$ |
|  | | Tensile Strength (psi): | | | |
| Wet | 500 | na | 1,400 | 680 | 700 |
| Dry | 1,100 | na | 1,200 | 600 | 1,500 |

Figure 10:
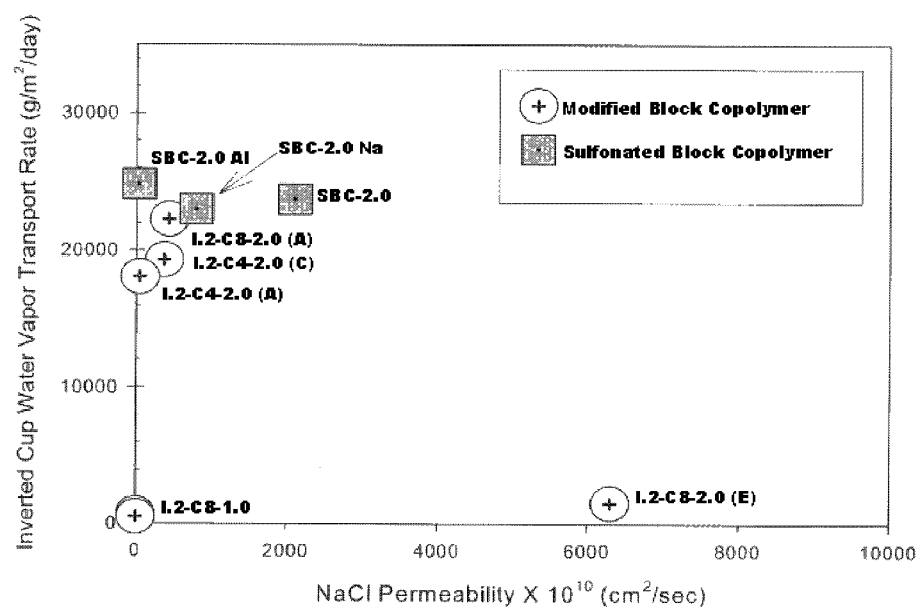
FIGS. 10 and 11 show the relationship of water vapor transmission and sodium chloride permeability of selected membranes according to the disclosure.

[1]Membrane thickness about 1 mil for all tests
*see annotation in Table 3 sodium chloride permeability (see FIG. 10). Based upon the date in FIG. 10, it is expected that especially the membranes of the type I.2-C4-2.0 (B), I.2-C4-2.0 (C), and I.2-C8-2.0 (A) under these test conditions will outperform membranes obtained by casting the corresponding sulfonated block copolymer from an apolar solution.

Figure 11:
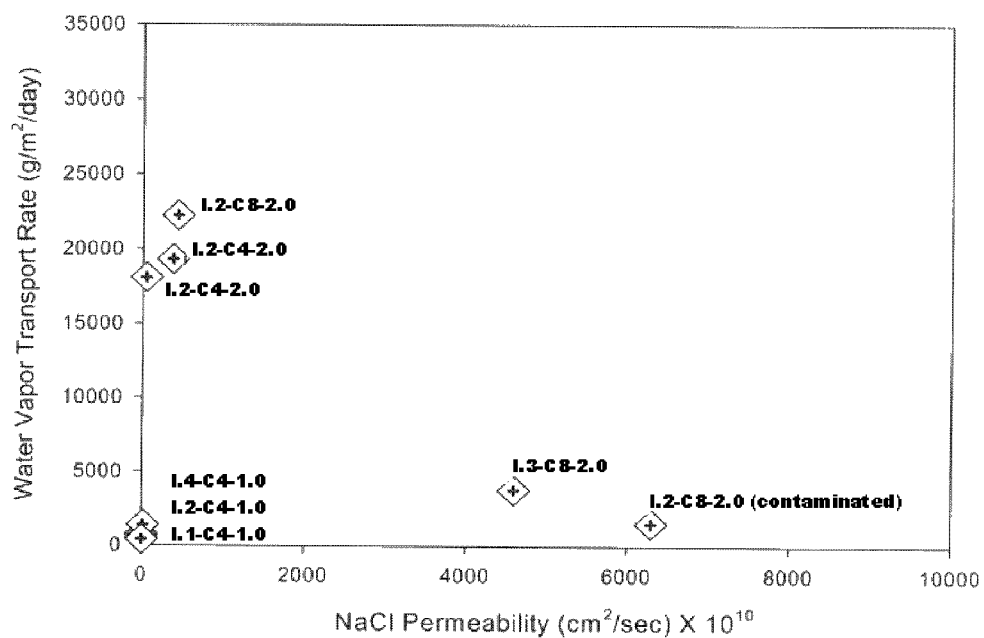

Although the modified block copolymers according to embodiment (I.3) have no ionizing functionality, membranes comprising these materials had rather robust transport performance. As noted in FIG. 11, the I.3-C8-2.0 membrane showed a high level of sodium chloride permeability combined with a low level of water transport. This is surprising because the high level of sodium chloride permeability which was measured for this membrane would be expected to require a high level of continuity in the sodium chloride transporting phase of the membrane. At this point, it is assumed that the sulfonamide portion of the polymer is transporting the salt molecules.

The structurally related I.3-C4-2.0 membrane transported water effectively. High water transport in a membrane with Notably, the I.2-C4-2.0 (A) and I.2-C8-2.0 (A) membranes had very high water transport performance in the inverted cup test (see Tables 5 and 6). As these membranes had selective ion transport performance in the conductivity test, they performed very well in the sodium chloride permeability test; very low sodium chloride permeability rates were observed for these membranes. As noted above, these membranes have very good dimensional stability on immersion in water. Membranes of this type are especially suited for reverse osmosis applications where high water flux, low salt transport and good dimensional stability are valued.

What is claimed is:

1. A membrane or film comprising a modified sulfonated block copolymer, the modified sulfonated block copolymer comprising at least two polymer end blocks A, at least one polymer interior block B, and one or more blocks D wherein
   each A block contains no sulfonic acid or sulfonate functional groups and comprise one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;

each B block comprises sulfonation susceptible monomer units comprising segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof and, based on the number of the sulfonation susceptible monomer units, from about 10 to about 100 mol % of a modified functional group of formula (I)

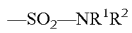  (I)

or of a salt thereof, wherein $R^1$ is a moiety $-(A^1-NR^a)_x R^b$ or a moiety $-(A^1-NR^a)_y-A^2-Z$; and $R^2$ is hydrogen, alkyl, or is one of the $R^1$ moieties; or $R^1$ and $R^2$ together with the nitrogen to which they are bonded form an optionally substituted 5- to 7-membered ring comprising 1-3 nitrogen atoms, 2-6 carbon, and optionally 1 or 2 non-adjacent oxygen and/or sulfur ring atoms;

x is 0, 1, 2 or 3;

y is 1 or 2;

$A^1$ and $A^2$, each independently, is straight chain alkylene optionally substituted by one or more methyl and/or ethyl groups;

$R^a$ and $R^b$, each independently, is hydrogen or alkyl;

Z is $-CO_2H$, $-SO_3H$ or $-P(O)(OH)_2$; and each D block being independently selected from the group consisting of (i) a polymerized or copolymerized conjugated diene selected from isoprene, and 1,3-butadiene, the polymerized conjugated diene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated, and wherein the modified sulfonated block copolymer has a general configuration A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different; and wherein the said membranes exhibit a conductivity of at least 0.5 mS/cm and wherein the dry tensile modulus of the modified sulfonated block copolymer is 10% to 99% of the dry tensile modulus of a corresponding unmodified sulfonated block copolymer that has sulfonic acid or sulfonate ester groups instead of the modified functional group.

2. The membrane or film of claim 1, wherein the B block comprises a functional group of the formula (I.1)

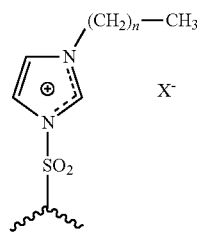

wherein n is 3 to 7, and $X^-$ is a halide, or a functional group of the formula (I.2)

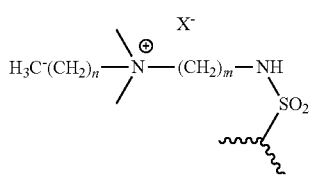

wherein n is from 3 to 7, m is 2 to 6, and $X^-$ is a halide.

3. The membrane or film of claim 1, wherein the block B comprises the functional group of formula (I), wherein $R^1$ and $R^2$ together form a substituted or unsubstituted imidazole, or alternatively, $R^1$ forms a N,N-dimethylethylenediamine and $R^2$ is hydrogen or alkyl.

4. The membrane or film of claim 1, wherein the block B comprises from about 25 to about 80 mol % of the functional group of formula (I).

5. The membrane or film of claim 1, wherein each A block comprises para-substituted styrene monomers and each B block comprises unsubstituted styrene monomers.

6. The membrane or film of claim 1, having a general configuration A-D-B-D-A, A-B-D-B-A, or mixtures thereof, wherein each D block is a polymer block resistant to sulfonation and the plurality of A blocks, B blocks, or D blocks are the same or different.

7. The membrane or film of claim 1 which has an anion exchange selectivity of at least 80%.

8. The membrane or film of claim 1 which has a water absorption of at most 20% by weight, based on a dry weight of the membrane.

9. The membrane or film of claim 1 which is obtained by
a) providing a composition comprising the modified sulfonated block copolymer in a liquid phase comprising one or more aprotic organic solvents,
b) casting the composition, and
c) evaporating the liquid phase.

10. The membrane or film of claim 6 wherein the A block comprises segments of para-tertbutyl styrene, the B block comprises segments of unsubstituted styrene monomers, and the D block comprises segments of hydrogenated isoprene.

11. The membrane or film of claim 1 wherein the block B comprises the functional group of formula (I) or a salt thereof, wherein $R^1$ and $R^2$ are identical and are $-(A^1-NR^a)_x R^b$ or $-(A^1-NR^a)_y-A\ SO_3H$ moieties.

12. An apparatus selected from the group consisting of fuel cells, filtration devices, devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, devices for capacitive deionization, devices for molecular filtration, devices for removing salt from water, devices for treating produced water from hydraulic fracturing applications, devices for ion transport applications, devices for softening water, and batteries, and comprising the membrane or film of claim 1.

13. An electro-deionization assembly comprising at least one anode, at least one cathode, and one or more membrane(s) wherein at least one membrane is the membrane of claim 1.

14. The electro-deionization assembly of claim 13 which comprises at least two membranes wherein at least one membrane is a cation-exchange membrane.

15. The electro-deionization assembly of claim 14 wherein the cation exchange membrane comprises a sulfonated block copolymer comprising at least two polymer end blocks A and at least one polymer interior block B, wherein each A block contains no sulfonic acid or sulfonated ester functional groups and each B block comprises sulfonation susceptible monomer units and, based on the number of the sulfonation susceptible monomer units, from about 10 to about 100 mol % of sulfonic acid or sulfonate ester functional groups.

16. The electro-deionization assembly of claim 15 which comprises at least two membranes wherein at least one membrane is an anion-exchange membrane.

17. The electro-deionization assembly of claim 13 which comprises at least two membranes wherein at least one membrane is a bipolar membrane.

18. A coated article comprising a substrate and the membrane or film of claim 1.

19. The coated article of claim 18, wherein the substrate is a natural material, a synthetic material, a woven or a non-woven material, or a mixture thereof.

20. A membrane or film comprising a modified sulfonated block copolymer, the modified sulfonated block copolymer comprising at least two polymer end blocks A, at least one polymer interior block B, and one or more blocks D wherein each A block contains essentially no sulfonic acid or sulfonate functional groups and comprise one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;

each B block comprises sulfonation susceptible monomer units comprising segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof and, based on the number of the sulfonation susceptible monomer units, from about 10 to about 100 mol % of a modified functional group of formula (I)

$$-SO_2-NR^1R^2 \qquad (I)$$

or of a salt thereof, wherein $R^1$ is a moiety $-(A^1-NR^a)_xR^b$ or a moiety $-(A^1-NR^a)_y-A^2-Z$; and $R^2$ is hydrogen, alkyl, or is one of the $R^1$ moieties; or $R^1$ and $R^2$ together with the nitrogen to which they are bonded form an optionally substituted 5- to 7-membered ring comprising 1-3 nitrogen atoms, 2-6 carbon, and optionally 1 or 2 non-adjacent oxygen and/or sulfur ring atoms;

x is 0, 1, 2 or 3;

y is 1 or 2

$A^1$ and $A^2$, each independently, is straight chain alkylene optionally substituted by one or more methyl and/or ethyl groups;

$R^a$ and $R^b$, each independently, is hydrogen or alkyl;

Z is $-CO_2H$, $-SO_3H$ or $-P(O)(OH)_3$;

each D block being independently selected from the group consisting of (i) a polymerized or copolymerized conjugated diene selected from isoprene, and 1,3-butadiene, the polymerized conjugated diene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated, and wherein the modified sulfonated block copolymer has a general configuration A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different; and wherein the modified sulfonated block copolymer has a water vapor transport rate ranging from about 1,000 to 20,000 g/m²/day, wherein the water vapor transport rate is measured at 50% relative humidity and 25° C. with a test membrane having 1 m² of exposed area and 1 mil of thickness, and wherein the dry tensile modulus of the modified sulfonated block copolymer is 10% to 99% of the dry tensile modulus of a corresponding unmodified sulfonated block copolymer that has sulfonic acid or sulfonate ester groups instead of the modified functional group.

21. The membrane or film of claim 20 having a thickness of 20-45 μm and an area resistance of no more than 5 Ωcm2.

* * * * *